(12) United States Patent
Liu et al.

(10) Patent No.: US 12,192,955 B2
(45) Date of Patent: Jan. 7, 2025

(54) WIRELESS COMMUNICATION METHOD, TERMINAL DEVICE, ACCESS NETWORK DEVICE AND CORE NETWORK DEVICE TO BE SWITCHED FROM A FIRST NETWORK TO A SECOND NETWORK

(71) Applicant: GUANGDONG OPPO MOBILE TELECOMMUNICATIONS CORP., LTD., Dongguan (CN)

(72) Inventors: Jianhua Liu, Dongguan (CN); Shukun Wang, South Yarra (AU); Yang Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 433 days.

(21) Appl. No.: 17/557,352

(22) Filed: Dec. 21, 2021

(65) Prior Publication Data
US 2022/0116910 A1    Apr. 14, 2022

Related U.S. Application Data

(63) Continuation of application No. PCT/CN2019/092418, filed on Jun. 21, 2019.

(51) Int. Cl.
*H04W 68/00* (2009.01)

(52) U.S. Cl.
CPC ................ *H04W 68/005* (2013.01)

(58) Field of Classification Search
CPC ....... H04W 36/0022–00226; H04W 36/00698; H04W 48/18–20; H04W 68/005; H04W 76/27; H04W 76/30; H04W 36/00–385
See application file for complete search history.

(56) References Cited

U.S. PATENT DOCUMENTS

| 6,694,144 B1* | 2/2004 | Zhang | H04W 68/00 370/339 |
| 2005/0096045 A1* | 5/2005 | Palmer | H04W 36/24 455/425 |

(Continued)

FOREIGN PATENT DOCUMENTS

| CN | 101925142 A | 12/2010 |
| CN | 108632926 A | 10/2018 |

(Continued)

OTHER PUBLICATIONS

International Search Report issued in corresponding International Application No. PCT/CN2019/092418, mailed Mar. 27, 2020, 42 pages.

(Continued)

Primary Examiner — Ronald Eisner
(74) Attorney, Agent, or Firm — BAYES PLLC

(57) ABSTRACT

A wireless communication method, a terminal device, an access network device and a core network device. The method comprises: a terminal device sending first indication information to a first network device, wherein the first indication information is used for indicating that the terminal device is to be switched from a first network or system to a second network or system, and the first network device is an access network device or a core network device in the first network or system.

8 Claims, 7 Drawing Sheets

200

A terminal device sending first indication information to a first network device, wherein the first indication information indicates that the terminal device is to be switched from a first network or system to a second network or system, and the first network device is an access network device or a core network device in the first network or system — S210

(56) References Cited

U.S. PATENT DOCUMENTS

| | | | |
|---|---|---|---|
| 2010/0113024 A1* | 5/2010 | Wu | H04W 36/1443 455/436 |
| 2011/0117909 A1 | 5/2011 | Cao et al. | |
| 2013/0294409 A1 | 11/2013 | Shuai et al. | |
| 2016/0057723 A1* | 2/2016 | Horn | H04W 76/28 455/435.2 |
| 2016/0183240 A1* | 6/2016 | Hu | H04J 11/00 455/67.11 |
| 2017/0150490 A1 | 5/2017 | Chen et al. | |
| 2019/0098596 A1 | 3/2019 | Basu Mallick et al. | |
| 2019/0141482 A1 | 5/2019 | Edge | |

FOREIGN PATENT DOCUMENTS

| | | |
|---|---|---|
| CN | 109196886 A | 1/2019 |
| CN | 109673029 A | 4/2019 |
| CN | 109792707 A | 5/2019 |
| CN | 109819481 A | 5/2019 |
| EP | 3328135 A1 | 5/2018 |

OTHER PUBLICATIONS

Written Opinion of the International Searching Authority issued in corresponding International Application No. PCT/CN2019/092418, mailed Mar. 27, 2020, 9 pages.

Extended European Search Report issued in corresponding Eurpean Application 19933829.4, mailed Aug. 30, 2022.

First Office Action issued in corresponding Chinese Application No. 201980088667.2, mailed Apr. 7, 2022, 37 pages.

Partial Supplementary European Search Report issued in corresponding European Application No. 19933829.4, mailed May 30, 2022, 16 pages.

* cited by examiner

200

| A terminal device sending first indication information to a first network device, wherein the first indication information indicates that the terminal device is to be switched from a first network or system to a second network or system, and the first network device is an access network device or a core network device in the first network or system | ⎯ S210 |

WIRELESS COMMUNICATION METHOD, TERMINAL DEVICE, ACCESS NETWORK DEVICE AND CORE NETWORK DEVICE TO BE SWITCHED FROM A FIRST NETWORK TO A SECOND NETWORK

CROSS REFERENCE TO RELATED APPLICATIONS

The disclosure is a continuation of an International Application No. PCT/CN2019/092418, filed on Jun. 21, 2019, titled "WIRELESS COMMUNICATION METHOD, TERMINAL DEVICE, ACCESS NETWORK DEVICE AND CORE NETWORK DEVICE", which is incorporated by reference in the present application in its entirety.

TECHNICAL FIELD

The present application relates to the field of communications, and particularly, to a wireless communication method, a terminal device, an access network device and a core network device.

BACKGROUND

In the related art, when there are multiple Subscriber Identity Module (SIM) cards in a terminal device, the terminal device may reside, register and keep standby in multiple networks or systems, where each SIM card may correspond to a respective network or system. When the terminal device has only one transmitting/receiving channel, such as only one transmitting/receiving radio frequency channel and/or baseband channel, the terminal device cannot simultaneously perform data communication with the network devices in multiple networks. Therefore, in a case that the terminal device is in the first network or system corresponding to the first SIM CARD and performing communication with a network device in the network, if the service also needs to be transmitted in the second network or system corresponding to the second SIM CARD, the terminal device will switch the transmitting/receiving channel to the network or system corresponding to the second SIM CARD. Network connections of the terminal device in the first network or system will be released within a certain time, which causes that the terminal device needs to re-establish the connection when ending the service in the second network or system and returning to the first network or system, rendering service interruption, and affecting user experience.

SUMMARY

Embodiments of the present application provide a wireless communication method, a terminal device, an access network device and a core network device, which are beneficial to avoid service interruption when a system switchover occurs for the terminal device.

In a first aspect, there is provided a wireless communication method, including: sending, by a terminal device, first indication information to a first network device, wherein the first indication information indicates that the terminal device is to be switched from a first network or system to a second network or system, and the first network device is an access network device or a core network device in the first network or system.

In a second aspect, there is provided a wireless communication method, including: receiving, by a first access network device, first indication information sent by a terminal device, wherein the first indication information indicates that the terminal device is to be switched from a first network or system to a second network or system, and the first access network device is an access network device in the first network or system; and switching, by the first access network device, the state of the terminal device in the first network or system from an active state to an inactive state or a suspended state.

In a third aspect, there is provided a wireless communication method, including: receiving, by a first core network device, first indication information sent by a terminal device, wherein the first indication information indicates that the terminal device is to be switched from a first network or system to a second network or system, and the first core network device is a core network device in the first network or system.

In a fourth aspect, there is provided a terminal device, configured to perform the method in the foregoing first aspect or any impossible implementation of the first aspect. Specifically, the terminal device includes a unit configured to perform the method in the foregoing first aspect or any impossible implementation of the first aspect.

In a fifth aspect, there is provided an access network device, configured to perform the method in the foregoing second aspect or any impossible implementation of the second aspect. Specifically, the network device includes a unit configured to perform the method in the foregoing second aspect or any impossible implementation of the second aspect.

In a sixth aspect, there is provided a core network device, configured to perform the method in the foregoing third aspect or any impossible implementation of the third aspect. Specifically, the network device includes a unit configured to perform the method in the foregoing third aspect or any impossible implementation of the third aspect.

In a seventh aspect, there is provided a terminal device. The terminal device includes: a processor and a memory. The memory is configured to store a computer program, and the processor is configured to call and run the computer program stored in the memory so as to perform the method in the foregoing first aspect or each implementation thereof.

In an eighth aspect, there is provided an access network device. The access network device includes: a processor and a memory. The memory is configured to store a computer program, and the processor is configured to call and run the computer program stored in the memory so as to perform the method in the foregoing second aspect or each implementation thereof.

In a ninth aspect, there is provided a core network device. The core network device includes: a processor and a memory. The memory is configured to store a computer program, and the processor is configured to call and run the computer program stored in the memory so as to perform the method in the foregoing third aspect or each implementation thereof.

In a tenth aspect, there is provided a chip, configured to implement the method in any of the foregoing first aspect to third aspect or each implementation thereof.

Specifically, the chip includes: a processor, configured to call and run a computer program from a memory, so that a device installed with the chip performs the method in any of the foregoing first aspect to third aspect or each implementation thereof.

In an eleventh aspect, there is provide a computer-readable storage medium for storing a computer program, wherein the computer program causes a computer to perform the method in any of the foregoing first aspect to third aspect or each implementation thereof.

In a twelfth aspect, there is provided a computer program product, including a computer program instruction, wherein the computer program instruction causes a computer to perform the method in any of the foregoing first aspect to third aspect or each implementation thereof.

In a thirteenth aspect, there is provided a computer program. When the computer program is run on a computer, the computer is caused to perform the method in any of the foregoing first aspect to third aspect or each implementation thereof.

Based on the foregoing technical solutions, when the terminal device is to be switched from the first network to the second network, the terminal device may send indication information to the network device in the first network, so as to indicate that the terminal device is to be switched from the first network or system to the second network or system. Further, the network device in the first network may switch the state of the terminal device in the first network from the active state to the inactive state or the suspended state. Thus, when the terminal device is switched back to the first network, the terminal device may continue to perform service transmission using a previously established network connection, or can rapidly restore the network connection of the terminal device in the first network. This is beneficial to avoid interruption of service transmission in the first network, and thereby can improve user experience.

DETAILED DESCRIPTION

The technical solutions in embodiments of the present application will be described below in conjunction with the accompanying drawings in embodiments of the present application. Obviously, the embodiments described are part of embodiments of the present application, rather than all the embodiments. Based on the embodiments in the present application, all other embodiments obtained by those of ordinary skilled in the art without creative work fall within the protection scope of the present application.

The technical solutions of embodiments of the present application may be applied to various communication systems, for example, a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a 5G system, etc.

Figures 1, 2:
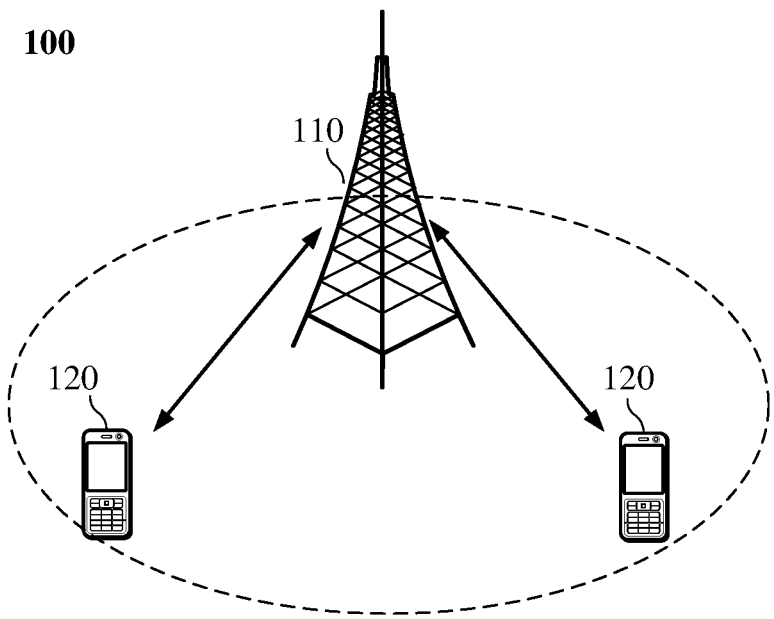
FIG. 1 is a schematic diagram of an application scenario provided by an embodiment of the present application.
FIG. 2 is a schematic flow chart of a wireless communication method provided by an embodiment of the present application.

Exemplarily, a communication system 100 applied in an embodiment of the present application is as shown in FIG. 1. The communication system 100 may include a network device 110, and the network device 110 may be a device which communicates with a terminal device 120 (or referred to as a communication terminal or a terminal). The network device 110 may provide communication coverage over a specific geographic area, and may communicate with a terminal device located within the coverage area.

Optionally, the network device 110 may be a Base Transceiver Station (BTS) in a GSM or a CDMA system, a NodeB (NB) in a WCDMA system, an Evolutional Node B (eNB or eNodeB) in an LTE system, or a wireless controller in a Cloud Radio Access Network (CRAN). Alternatively, the network device may be a mobile switching center, a relay station, an access point, an in-vehicle device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage area of the network device 110. As used here, the "terminal device" includes, but not limited to, a connection via a wired line, such as a connection via Public Switched Telephone Networks (PSTN), a Digital Subscriber Line (DSL), a digital cable, a direct cable; and/or another data connection/network; and/or an interface via wireless, such as for a cellular network, a Wireless Local Area Network (WLAN), a digital TV network such as a DVB-H network, a satellite network, an AM-FM broadcast; and/or an apparatus of another terminal device configured to receive/send a communication signal; and/or an Internet of Things (IoT) device. The terminal device configured to communicate through a wireless interface may be referred to as a "wireless communication terminal", a "wireless terminal" or a "mobile terminal".

Examples of the mobile terminal include, but not limited to, a satellite or cellular telephone; a Personal Communications System (PCS) terminal which may combine a cellular radio telephone with capabilities of data processing, faxing and data communication; a PDA which may include a radio telephone, a pager, internet/intranet access, a web browser, a notebook, a calendar, and/or a Global Positioning System (GPS) receiver; and a conventional laptop and/or palmtop receiver or other electronic apparatus including a radio telephone transceiver.

The terminal device may refer to an access terminal, User Equipment (UE), a user unit, a user station, a mobile station, a mobile platform, a remote station, a remote terminal, a mobile device, a user terminal, a terminal, a wireless communication device, a user agent, or a user apparatus. The access terminal may be a cellular telephone, a cordless telephone, a Session Initiation Protocol (SIP) telephone, a Wireless Local Loop (WLL) station, a Personal Digital Assistant (PDA), a handheld device capable of wireless communication, a computing device or other processing device connected to a wireless modem, an in-vehicle device, a wearable device, a terminal device in a 5G network, or a terminal device in a future evolved PLMN, etc.

Optionally, Device to Device (D2D) communication may be performed between the terminal devices 120.

Optionally, a 5G system or a 5G network may also be referred to as a New Radio (NR) system or a NR network.

FIG. 1 exemplarily shows one network device and two terminal devices. Optionally, the communication system 100 may include a plurality of network devices, and other number of terminal devices may be included within the coverage area of each network device, which is not limited by embodiments of the present application.

Optionally, the communication system 100 may also include other network entity such as a network controller, a mobile management entity and the like, which is not limited by embodiments of the present application.

It should be understood that the device with the communication function in the network/system in an embodiment of the present application may be referred to as a communication device. Taking the communication system 100 shown in FIG. 1 as an example, a communication device may include the network device 110 and the terminal device 120 with the communication function, and the network device 110 and the terminal device 120 may be the specific devices described above, which is not elaborated here. The communication device may also include other device in the communication system 100, for example, other network entity such as a network controller, a mobile management entity and the like, which is not limited in embodiments of the present application.

It should be understood that the terms "system" and "network" herein are often used interchangeably herein. The term "and/or" herein is only to describe a kind of association relationship among associated objects, and means that there may be three kinds of relationships. For example, A and/or B, may mean that there are the following three cases: A exists alone, A and B exist at the same time, and B exists alone. In addition, the character "/" herein generally indicates that the associated objects before and after thereof are in an "or" relationship.

FIG. 2 is a schematic flow chart of a wireless communication method provided by an embodiment of the present application. The method may be performed by a terminal device in the communication system shown in FIG. 1. As shown in FIG. 2, the method 200 includes at least contents of the following part.

In S210, a terminal device sends first indication information to a first network device, wherein the first indication information indicates that the terminal device is to be switched from a first network or system to a second network or system, and the first network device is an access network device or a core network device in the first network or system.

In an embodiment of the present application, the terminal device may support multiple networks or systems, and the multiple networks or systems may be the networks or systems corresponding to a plurality of SIM cards of the terminal device. For example, the multiple networks or systems may correspond to different frequency bands or modes.

When the terminal device determines to be switched from the first network to the second network, the terminal device may send indication information to a first access network device in the first network, so as to inform the first access network device that the terminal device is to be switched from the first network to the second network. Thus, the first access network device may switch the state of the terminal device in the first network to an inactive state or a suspended state.

In an embodiment of the present application, when the state of the terminal device in the first network is the inactive state, network connections of the terminal device with a core network side and an access network side in the first network are maintained, and contextual information of the terminal device in the first network is maintained not only at the core network side and the access network side of the first network, but also at a terminal device side. Thus, when the terminal device returns to the first network from the second network, the terminal device does not have to initiate a procedure for re-establishing the network connection, but may continue to perform communication using a previously established network connection. This can reduce the signaling overhead of connection re-establishment, and avoid interruption of service, thereby improving user experience.

In an embodiment of the present application, when the state of the terminal device in the first network is the suspended state, the network connections of the terminal device with the core network side and the access network side in the first network are released, and the contextual information of the terminal device in the first network is maintained not only at the core network side and the access network side of the first network, but also at the terminal device side. Thus, when the terminal device is switched back to the first network, the terminal device can rapidly restore the network connection of the terminal device in the first network according to the saved contextual information of the terminal device. This also may avoid interruption of service, thereby improving user experience.

It should be understood that in an embodiment of the present application, restarting to use the first network may also be referred to as the terminal device returning to the first network from the second network; and stopping using the first network and starting to use the second network may be referred to as the terminal device leaving the first network and entering the second network.

Optionally, in an embodiment of the present application, when the terminal device is using the first network currently, and receiving service from the second network, the terminal device may determine to be switched from the first network to the second network. For example, when the terminal device is performing video service using the first network, and voice service is received in the second network, the terminal device may determine to be switched from the first network to the second network for the voice service. That is to say, the terminal device stops using the first network and starts to use the second network.

Optionally, in an embodiment of the present application, the first indication information sent to the first access network device by the terminal device may include at least one of: information of a state expected to be in the first network by the terminal device, such as the inactive state or the suspended state, etc.; information that the terminal device is switched to the second network for service transmission; information of a service transmitted by the terminal device when switched to the second network; information of a duration when the terminal device performs service transmission in the second network; and information of a service expected to be paged in the first network by the terminal device.

By way of example but not limitation, the information of the service transmitted by the terminal device when switched to the second network includes type information of the service and/or quality of service (QoS) information of the service.

By way of example but not limitation, the type information of the service includes at least one of: voice service, short message service, emergency service, high-priority service, low-latency service, and high-reliability service, etc.

By way of example but not limitation, the QoS information of the service includes at least one of: 5G QoS indicator (5QI), latency information, reliability information, and throughput, etc.

Optionally, the information of the service expected to be paged in the first network by the terminal device may be type information of the service expected to be paged, such as voice service, short message service, emergency service, and high-priority service, etc. Alternatively, it may also be QoS information of the service, such as 5QI information, latency information, and reliability information, etc.

In some embodiments, the terminal device may directly send the first indication information to the first access network device. In other embodiments, the terminal device may send the first indication information to the first access network device through a core network device in the first network.

For example, the terminal device may firstly send the first indication information to the core network device, such as an access and mobility management function (AMF). Specifically, the terminal device may send with an information type through which interaction between the core network and the terminal device is performed. For example, it may send through non-access stratum (NAS) information. Further, the core network device forwards the received first indication information to the first access network device.

Optionally, in an embodiment of the present application, after receiving the first indication information, the first access network device may switch the state of the terminal device in the first network to the inactive state or the suspended state.

For example, the first access network device may send a first signaling to the terminal device, such as a radio resource control (RRC) signaling, so as to switch the state of the terminal device in the first network from an active state to the inactive state or the suspended state through the first signaling.

Optionally, in some embodiments, the first signaling may include at least one of the following: time information; second indication information, indicating whether the terminal device in the inactive state or the suspended state needs to monitor a paging message in the first network; and third indication information, indicating whether the terminal device needs to send a notification message to a network device in the first network when switched back to the first network.

Optionally, in an embodiment, the time information is information of time when the terminal device is maintained in the inactive state.

For the terminal device, after receiving the first signaling including the time information, the terminal device may start a timer, duration of which may be a duration indicated by the time information. When the timer times out, and the terminal device does not return to the first network, i.e., not starting to re-use the first network, the terminal device releases the contextual information of the terminal device in the first network, and returns to an idle state.

For the first access network device, after sending the first signaling including the time information, the first access network device may also start a timer. When the timer times out, and the first access network device does not return to the first network, for example, a notification message or an available message that the terminal device returns to the first network is not received, the first access network device releases the locally saved contextual information of the terminal device in the first network. Optionally, the first access network device may also instruct the core network side, such an AMF, also to release the contextual information of the terminal device, and to release the network connection of the terminal device in the first network, such as N2 and N3 related connections.

Optionally, in another embodiment, the time information is information of time for monitoring a paging message in the first network by the terminal device.

For the terminal device, after receiving the first signaling including the time information, the terminal device may start a timer. The terminal device does not monitor a paging message in the first network before the timer times out. The terminal device starts to monitor a paging message in the first network when the timer times out.

For the first access network device, after sending the first signaling including the time information, the first access network device may start a timer. During the running time of the timer, the first access network device considers the terminal device unavailable and does not send a paging message. When the timer times out, the first access network device considers the terminal device available, and sends a paging message.

In an embodiment of the present application, when the terminal device is maintained in the inactive state or the suspended state, the terminal device may choose to monitor a paging message in the first network, may not monitor a paging message in the first network, or may monitor a paging message in the case that a specific condition is satisfied. Embodiments of the present application are not limited in this regard, and the specific implementations are described in detail in the detailed description section.

In an embodiment of the present application, when the terminal device is maintained in the inactive state or the suspended state, the network device in the first network, such as the first access network device or the core network device, may choose to send a paging message or not to send a paging message. Alternatively, it may choose the type of the paging message to be sent, or may send a paging message in the case that a specific condition is satisfied, etc. Embodiments of the present application are not limited in this regard, and the specific implementations are described in detail in the detailed description section.

Hereinafter, without loss of generality, taking the terminal device being UE, the first access network device being a radio access network (RAN), and a first core device being an AMF as an example, a plurality of embodiments according to the present application are introduced. It should be understood that embodiments of the present application may also apply to other communication systems, such as an evolved packet system (EPS). In this case, the AMF may be a mobility management entity (MME), a user plane function (UPF) may be a packet data network gateway-user (PGW-U), a session management function (SMF) may be a serving gateway (SGW), and N2 and N3 interfaces may be an S1AP interface and an S1-U interface.

Figure 3:
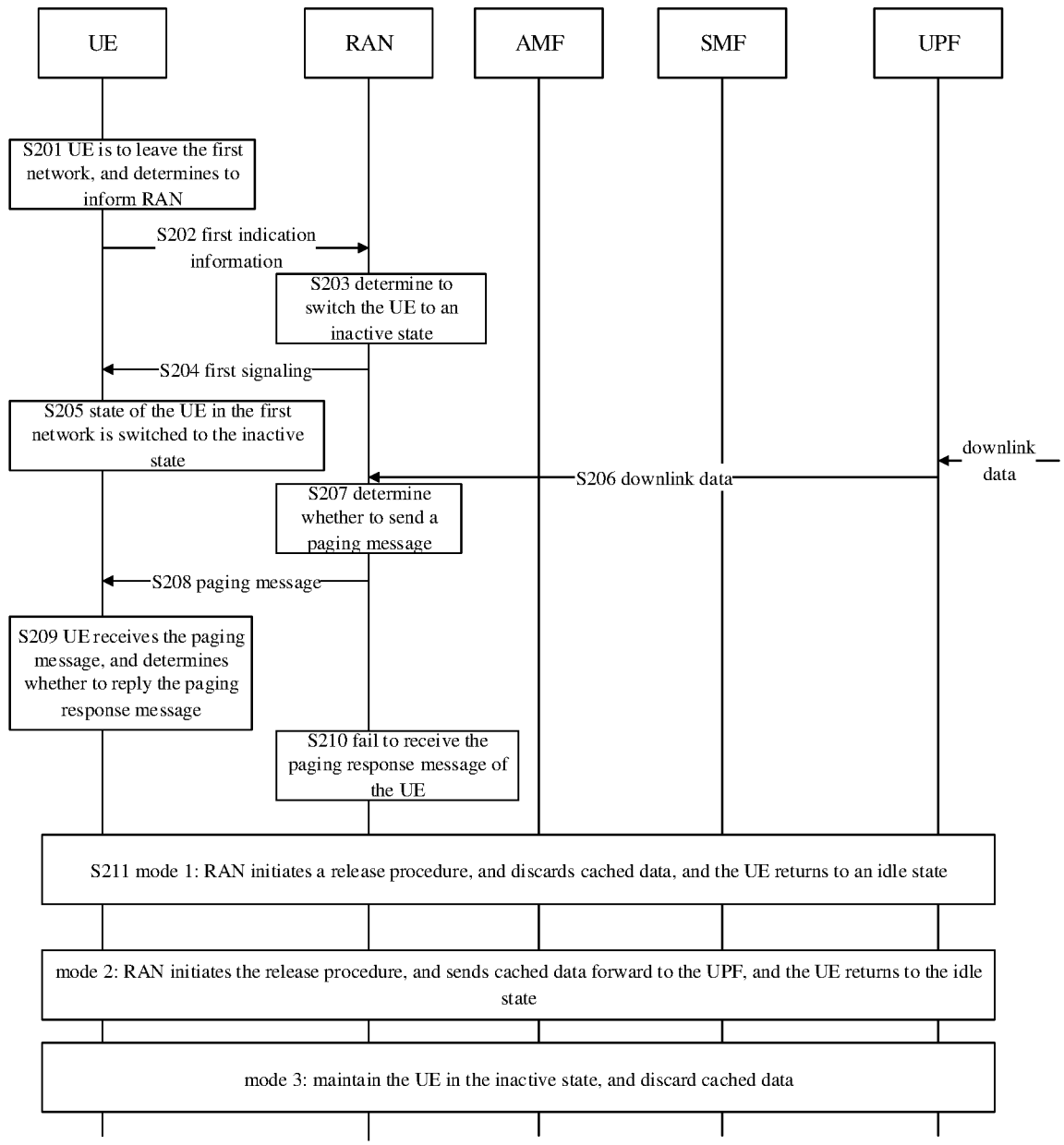
FIG. 3 is a schematic interaction diagram of a wireless communication method provided by an embodiment of the present application.

FIG. 3 is a schematic flow chart of a first embodiment of the present application. As shown in FIG. 3, the method 200 may include the following.

In S201, UE determines to be switched from the first network to the second network, and determines that an RAN needs to be informed.

For example, when the UE is performing video service using the first network, and the second network receives the voice service, the UE may determine to be switched from the first network to the second network so as to perform the voice service.

Further, in S202, the UE sends first indication information to the RAN, wherein the first indication information is used for informing the RAN that the UE is to be switched from the first network to the second network.

Optionally, in some embodiments, the first indication information may include at least one of the following: information of a state expected to be in the first network by the terminal device, such as the inactive state or the suspended state, etc.; information that the terminal device is switched to the second network for service transmission; information of a service transmitted by the terminal device when switched to the second network; information of a duration when the terminal device performs service transmission in the second network; and information of a service expected to be paged in the first network by the terminal device.

By way of example but not limitation, the information of the service transmitted by the terminal device when switched to the second network includes type information of the service and/or quality of service (QoS) information of the service.

By way of example but not limitation, the type information of the service includes at least one of the following: voice service, short message service, emergency service, high-priority service, low-latency service, and high-reliability service, etc.

By way of example but not limitation, the QoS information of the service includes at least one of the following: 5G QoS indicator (5QI), latency information, reliability information, and throughput, etc.

Optionally, the information of the service expected to be paged in the first network by the terminal device may be type information of the service expected to be paged, such as voice service, short message service, emergency service, and high-priority service, etc. It may also be QoS information of the service, such as 5QI information, latency information, and reliability information, etc.

In some embodiments, the UE may directly send the first indication information to the RAN. In other embodiments, the UE may send the first indication information to the RAN through a core network device in the first network. For example, the UE may first send the first indication information to the core network device, such as the AMF. For example, it may be sent through the NAS message. Further, the core network device sends the first indication information to the RAN after receiving the first indication information.

In S203, after receiving the first indication information of the UE, the RAN determines to switch the UE to the inactive state according to the first indication information.

Optionally, in S204, the RAN may send a first signaling to the UE, such as a radio resource control (RRC) signaling, and switch the state of the UE in the first network from an active state to the inactive state through the first signaling.

Optionally, the first signaling may include at least one of the following: time information; second indication information, indicating whether the terminal device in the inactive state or the suspended state needs to monitor a paging message in the first network; and third indication information, indicating whether the terminal device needs to send a notification message to the network device in the first network when switched back to the first network.

For the meaning of the time information in the first signaling, the RAN and the UE may perform corresponding operations.

As the first meaning, the time information is information of time when the UE is maintained in the inactive state.

For the UE, after receiving the first signaling including the time information, the UE may start a timer, duration of which may be a duration indicated by the time information. When the timer times out, and the UE does not return to the first network, the UE releases the contextual information of the UE in the first network, and returns to an idle state.

For the RAN, after sending the first signaling including the time information, the RAN may start a timer. When the timer times out, and the UE does not return to the first network, for example, a notification message or an available message that the UE returns to the first network is not received, the RAN may releases the locally saved contextual information of the UE in the first network. Optionally, the RAN may instruct an AFM also to release the contextual information of the UE, and releases the network connection of the UE in the first network, such as N2 and N3 related connections.

As the second meaning, the time information is information of time for monitoring a paging message in the first network by the UE.

For the UE, after receiving the first signaling including the time information, the UE may start a timer. The terminal device does not monitor a paging message in the first network before the timer times out, and the UE starts to monitor a paging message in the first network when the timer times out.

For the RAN, after sending the first signaling including the time information, the RAN may start a timer. During the running time of the timer, the RAN considers the UE unavailable and does not send a paging message. When the timer times out, the RAN considers the UE available and sends a paging message.

In S205, the UE is maintained in the inactive state in the first network.

In S206, when downlink data arrives, a UPF will receive the downlink data and send it to the RAN.

In S207, after receiving the downlink data, the RAN may determine whether a paging message needs to be sent to the UE. The paging message here may have the same format as an existing paging message.

Optionally, in an embodiment, after receiving the downlink data, the RAN may not make any decision, and directly send the paging message to the UE.

In another embodiment, after receiving the downlink data, the RAN may determine whether to send the paging message according to whether the UE returns to the first network. For example, if the RAN receives a notification message sent by the UE indicating return to the first network, the RAN determines to send the paging message, and further, may send the paging message to the UE. Alternatively, if the RAN does not receive the notification message sent by UE indicating return to the first network, the RAN determines not to send the paging message. Optionally, the RAN may also send the notification message that the UE is not available to a core network, such as the AMF or the UPF.

Optionally, in still another embodiment, the RAN may also send the paging message according to the time information in the first signaling. For example, during the running time of the timer, the RAN may not send a first class paging message. When the timer times out, the paging message is sent.

If determining to send the paging message in S207, the RAN may further send the paging message to the UE.

For the UE, a paging message in the first network may be monitored. Alternatively, it may be determined whether a paging message in the first network needs to be monitored according to second indication information in the first signaling. For example, the UE determines to monitor a paging message in the first network, if the second indication information indicates that a paging message in the first network does not need to be monitored. Otherwise, the UE determines to monitor a paging message in the first network.

In S208, the UE has monitored the paging message sent by the RAN, and further the UE may determine whether to reply a paging response message to the RAN.

Optionally, the UE may determine whether to reply the paging response message according to attributes such as the information of the service in the second network, the type of the paging message received, the priorities of the first network and the second network, and the like.

For example, if service transmission in the second network is not ended, the UE may determine not to reply a paging response message. Alternatively, the UE may also determine whether to reply a paging response message based on a timer. For example, during the running time of the timer, it may be considered that service in the second network is not ended and a paging response message is not replied. When the timer times out, it may be considered that service in the second network is ended, and a paging response message is replied.

In another example, if the service in the second network is high-priority service, and optionally, the priority of the high-priority service is higher than a specific priority threshold, such as emergency call service and the voice service, etc., it is determined that a paging response message is not replied.

In still another example, the service in the second network is service of a specific type, such as voice service or emergency service, and it is determined that a paging response message is not replied.

In still another example, the priority of the service in the second network is higher than that of the downlink data to be transmitted, and it is determined that a paging response message is not replied.

In still another example, the priority of the second network is higher than that of the first network, and it is determined that a paging response message is not replied.

Optionally, in an embodiment of the present application, the priorities of the first network and the second network may be obtained according to subscription information of the UE, configured by a network device, set by a user of the UE, or agreed according to protocol.

Further, if the RAN receives a paging response message of the UE, the RAN may determines that the UE returns to the first network. Because the network connections of the UE in the first network are maintained and the contextual information of the UE is maintained not only at the UE side, but also at the access network side and the core network side, the UE may continue to perform service transmission in the first network using the previous network connection.

Optionally, the RAN may switch the state of the UE in the first network from the inactive state to the active state.

Alternatively, if the RAN does not receive a paging response message of the UE in S209, the RAN may consider the UE unavailable, and the RAN may perform the following operations in S210.

In mode 1, the RAN initiates a release procedure, locally releases context of the UE, and releases the network connections of the UE, such as N2 and N3 connections. Optionally, the RAN may also instruct the AMF and the SMF to release the locally saved context of the UE. The RAN may also discard the received downlink data and switch the UE to the idle state.

In mode 2, the RAN initiates the release procedure, locally releases the context of the UE, and releases the network connections of the UE, such as N2 and N3 connections. The RAN may also instruct the AMF and the SMF to release the locally saved context of the UE. The RAN may also send the received downlink data back to the UPF side.

In mode 3, the RAN maintains the UE in the inactive state. Optionally, the RAN may discard the cached downlink data, or send the cached downlink data forward to the UPF side. Optionally, before receiving the notification message or the available message that the UE returns to the first network, the RAN does not send a paging message to the UE any more. Optionally, the RAN may also start a timer, and before the timer times out, the RAN does not send a paging message to the UE.

Figure 4:
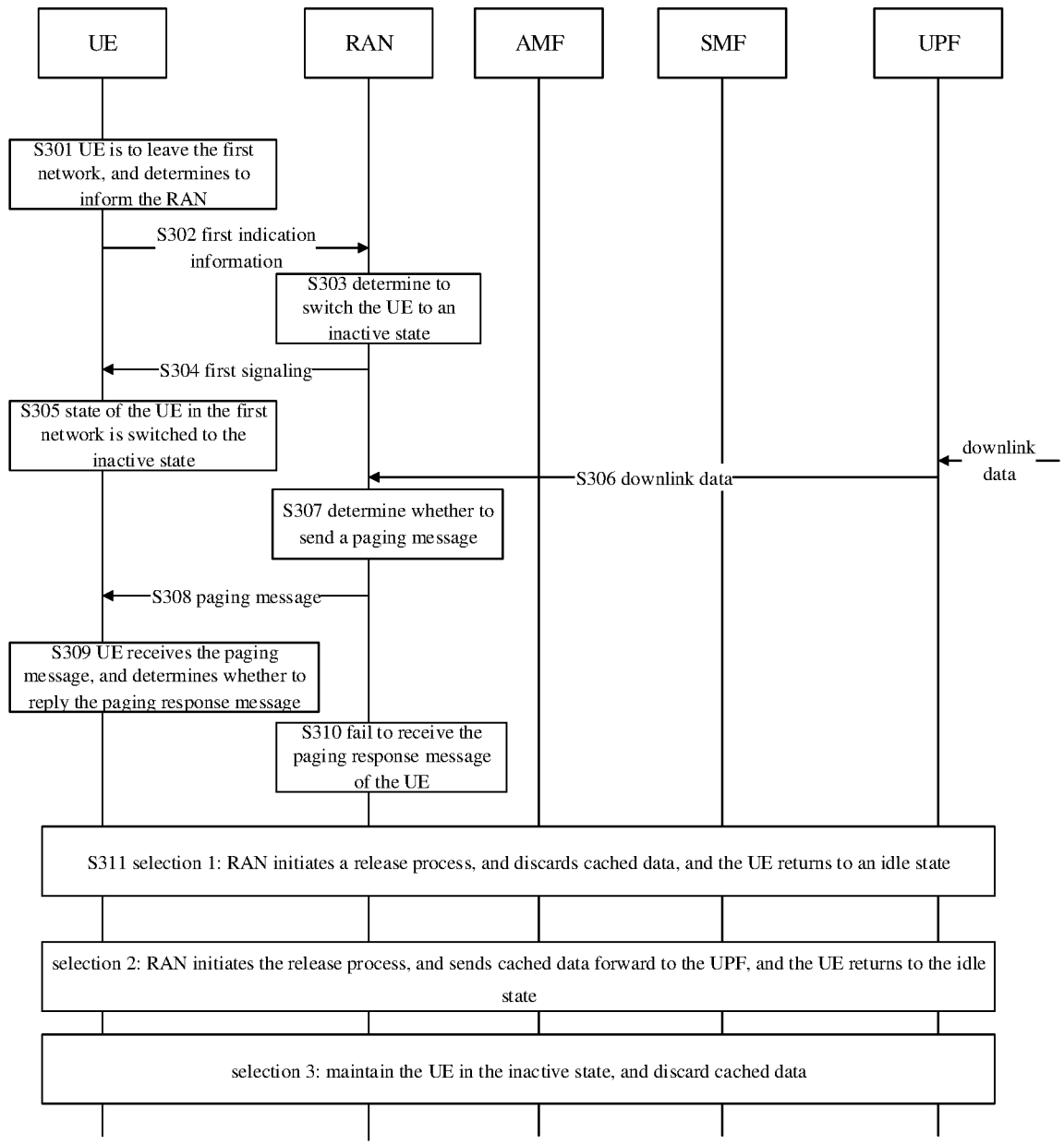
FIG. 4 is a schematic interaction diagram of a wireless communication method provided by an embodiment of the present application.

FIG. 4 is a schematic flow chart of a second embodiment of the present application. As shown in FIG. 4, the method includes the following.

It should be understood that for the specific implementations of similar steps between the first embodiment and the second embodiment, related description of the first embodiment can be referred to.

In S301, the UE determines to be switched from the first network to the second network, and determines that the RAN needs to be informed.

S301 may correspond to S201 in the first embodiment shown in FIG. 3. For the specific implementation, related description of the foregoing embodiment can be referred to, which is not elaborated here.

In S302, the UE send the first indication information to the RAN, wherein the first indication information is used for informing the RAN that the UE is to be switched from the first network to the second network.

S302 may correspond to S202 in the first embodiment shown in FIG. 3. For the specific implementation, related description of the foregoing embodiment can be referred to, which is not elaborated here.

In S303, after receiving the first indication information of the UE, the RAN determines to switch the UE to the inactive state according to the first indication information.

Optionally, in S304, the RAN may send the first signaling to the UE, and switch the state of the UE in the first network from the active state to the inactive state through the first signaling.

S304 may correspond to S204 in the first embodiment shown in FIG. 3. For the specific implementation, related description of the foregoing embodiment can be referred to, which is not elaborated here.

In S305, the UE is maintained in the inactive state in the first network.

In S306, when the downlink data arrives, the UPF will send the received downlink data to the RAN.

In S307, after receiving the downlink data, the RAN may determine whether a paging message needs to be sent to the UE.

Optionally, in some embodiments, the paging message includes service attribute information of the downlink data. Optionally, the service attribute information of the downlink data may include at least one of the following: protocol data unit (PDU) session information, such as a PDU session identify (ID); QoS flow information, such as a QoS flow ID; data radio bearers (DRB) information, such as a DRB ID; and 5QI information of the downlink data.

For ease of distinction and description, in an embodiment of the present application, the paging message including the service attribute information of the downlink data is donated as the second class paging message or referred to as an enhanced paging message, and the paging message without the service attribute information of the downlink data is donated as the first class paging message or referred to as a normal paging message. A message of the first class paging message may have the same format as an existing paging message, and the paging message in the first embodiment may be the first class paging message.

Optionally, the RAN may determine the service attribute information of the downlink data according to the received downlink data. For example, the PDU session of the downlink data can be determined according to information of N3 tunnel receiving the downlink data. The 5QI of the downlink data can be determined according to the QoS flow identifier (QFI) therein. The DRB information of the downlink data can be determined according to the PDU session ID and/or the QFI information of the downlink data.

Optionally, in S307, the RAN may determine whether to send a paging message, and further may also determine which type of paging message to be sent, such as the first class paging message or the second class paging message as mentioned previously.

Optionally, the RAN may determine whether to send a paging message or may determine the type of the paging message to be sent according to information such as whether the UE returns to the first network, the time information in the first signaling, the service attribute of the downlink data, the priorities of the first network and the second network, information of the service expected to be paged in the first network by the terminal device, and the like.

For example, the RAN may determine whether to send a second class paging message according to whether the UE is available. For example, it is determined that the second class paging message is sent when the UE is available. Otherwise, it is determined that the second class paging message is not sent.

Alternatively, the RAN may determine to send a first class paging message or a second class paging message according to whether the UE is available. For example, the RAN may send the second class paging message when the UE is unavailable, or send the first class paging message when the UE is available. Alternatively, the RAN may send the first class paging message when the UE is unavailable, or send the second class paging message when the UE is available.

As another example, the RAN may also determine whether to send a second class paging message according to the time information in the first signaling. For example, during the running time of the timer, if the RAN considers the UE unavailable, the RAN may not send the second class paging message. When the timer times out, and the RAN considers the UE available, the RAN starts to send the second class paging message.

As still another example, the RAN may also determine whether to send a paging message according to the service attribute information of the downlink data. For example, if the priority of the downlink data is higher than a specific priority threshold, or the downlink data is service of a specific type, such as voice service or emergency service, the RAN may determine to send a paging message, wherein the paging message may be a first class paging message, or may be a second class paging message.

Further, according to the service attribute information of the downlink data, in combination with the information of the service expected to be paged in the first network by the terminal device that is included in the first indication information, the RAN may determine whether to send a second class paging message.

Optionally, if the information of the service expected to be paged in the first network by the terminal device includes the service information of the downlink data, for example, the downlink data is the voice service, and the type of the service expected to be paged in the first network by the terminal device includes the voice service, or if the latency requirement of the downlink data is higher than the latency information of the service expected to be paged by that the terminal device, the RAN may determine to send the second class paging message.

In still another example, the RAN may determine whether to send a paging message according to the priorities of the first network and the second network. For example, it is determined that a paging message is sent if the priority of the first network is higher than that of the second network, and otherwise, a paging message is not sent, wherein the paging message here may be a first class paging message, or may be a second class paging message. Alternatively, it is determined that the second class paging message is sent if the priority of the first network is higher than that of the second network, and otherwise, the first class paging message is sent, or vice versa.

If the RAN determines to send a paging message in S307, the RAN may further send the paging message to the UE. Specifically, if the RAN determines to send a first class paging information, the RAN may send the first class paging message to the UE. Alternatively, if the RAN determines to send a second class paging message, the RAN may send the second class paging message to the UE, i.e., the paging message including the service attribute information of the downlink data.

For UE, a paging message in the first network may be monitored. Alternatively, it may be determined whether a paging message in the first network needs to be monitored according to the second indication information in the first signaling. For example, the UE monitors a paging message in the first network if the second indication information indicates that a paging message in the first network does not need to be monitored, and otherwise, a paging message in the first network is monitored.

In S308, the UE has monitored a paging message sent by the RAN, where the paging message may be a first class paging message or a second class paging message, and further, the UE may determine whether to reply a paging response message to the RAN.

Optionally, the UE may determine whether to reply a paging response message according to attributes such as the information of the service in the second network, the type of the received paging message, the service attribute information of the downlink data included in the paging message, the priorities of the first network and the second network, the information of the service expected to be paged in the first network by the terminal device, and the like.

For example, if the service transmission in the second network is not ended, the UE may determine not to reply a paging response message. Alternatively, the UE may also determine whether to reply a paging response message based on a timer. For example, during the running time of the timer, it may be considered that service in the second network is not ended and a paging response message is not replied. When the timer times out, it may be considered that service in the second network is ended, and a paging response message is replied.

In another example, if the service in the second network is high-priority service, and optionally, the priority of the high-priority service is higher than a specific priority threshold, such as emergency call service and voice service, etc., it is determined that a paging response message is not replied.

In still another example, the service in the second network is service of a specific type, such as voice service or emergency service, and it is determined that a paging response message is not replied.

In still another example, the priority of the service in the second network is higher than that of the downlink data to be transmitted, and it is determined that a paging response message is not replied.

In still another example, the priority of the second network is higher than that of the first network, and it is determined that a paging response message is not replied.

In still another example, if the information of the service expected to be paged in the first network by the terminal device does not include the service information of the downlink data to be transmitted, for example, the downlink data is the video service, and the type of the service expected to be paged in the first network by the terminal device does not include the video service, or if the latency requirement of the downlink data is lower than the latency information of the service expected to be paged by the terminal device, the terminal device may not reply a paging response message.

Optionally, the UE may also determine whether to respond to a paging message according to the type of the paging message received, such as a first class paging message or a second class paging message. For example, if the received paging message is the first class paging message, the UE may determine to respond to the paging message. Alternatively, if the received paging message is the second class paging message, the UE may determine to respond to the paging message.

Further, if the RAN receives a paging response message of the UE, the RAN may determine that the UE returns to the first network. Because the network connections of the UE in the first network are maintained, and the contextual information of the UE is maintained not only at the UE side, but also at the access network side and the core network side, the UE may continue to perform service transmission in the first network using the previous network connection. This can avoid the signaling overhead of connection re-establishment, and can avoid interruption of the service transmission, thus improving user experience.

Optionally, after the UE returns to the first network, the RAN may switch the state of the UE in the first network from the inactive state to the active state.

Alternatively, if the RAN does not receive a paging response message of the UE in S309, the RAN may consider the UE unavailable, and further, the RAN may perform corresponding operations in S310. It should be understood that S310 may correspond to S210 in the first embodiment shown in FIG. 2. For the specific implementation, related description of the first embodiment can be referred to, which is not elaborated here.

Figure 5:
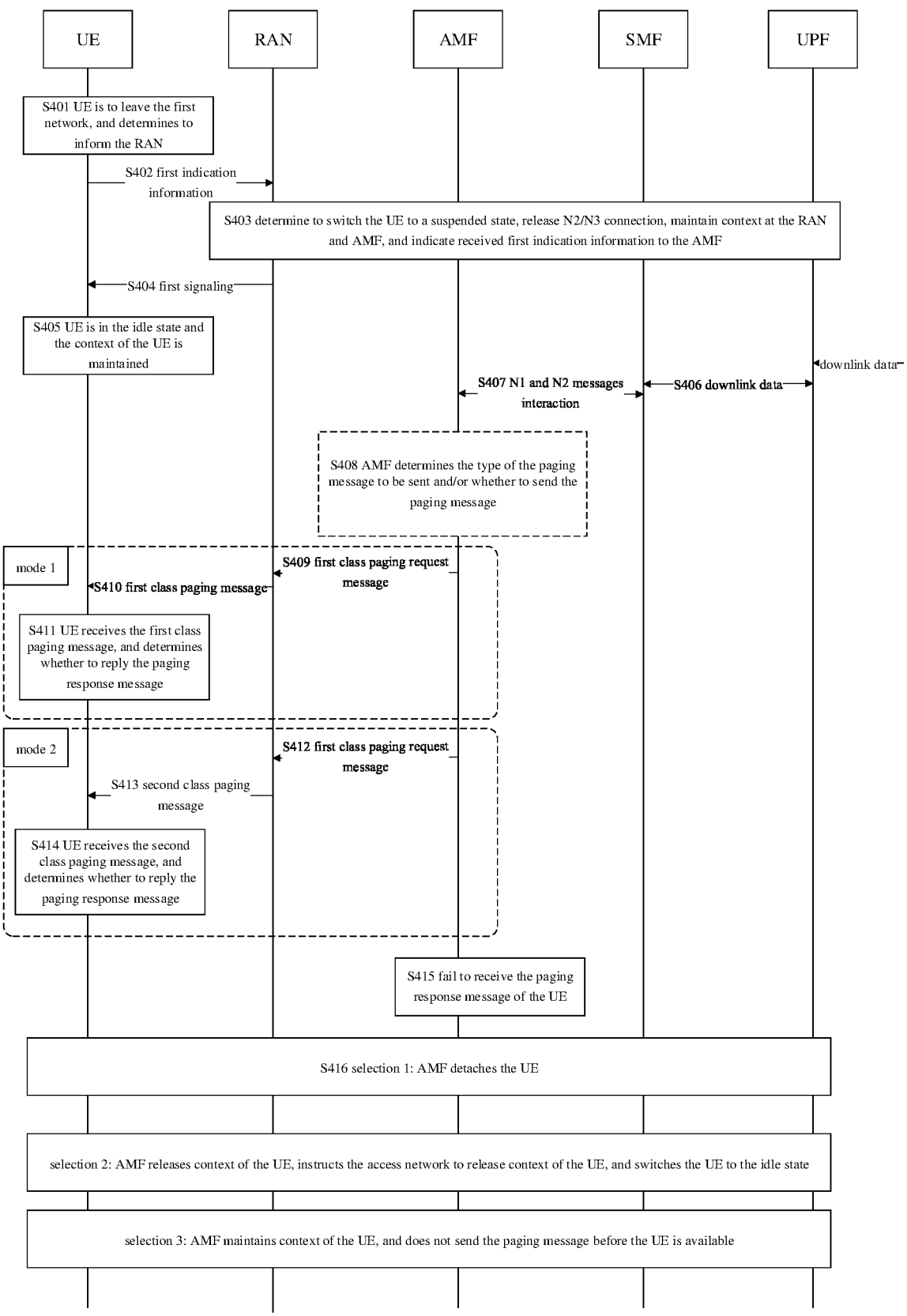
FIG. 5 is a schematic interaction diagram of a wireless communication method provided by an embodiment of the present application.

FIG. 5 is a schematic flow chart of a third embodiment of the present application. As shown in FIG. 5, the method may include the following.

In S401, the UE determines to be switched from the first network to the second network, and determines that the RAN needs to be informed.

S401 may correspond to S201 in the first embodiment shown in FIG. 3. For the specific implementation, related description of the foregoing embodiments can be referred to, which is not elaborated here.

In S402, the UE sends the first indication information to the RAN, wherein the first indication information is used for informing the RAN that the UE is to be switched from the first network to the second network.

For the content and the meaning included in the first indication information, related description of the foregoing embodiments can be referred to, which is not elaborated here.

Optionally, after receiving the first indication information, the RAN may send the first indication information to the core network, such as the AMF. Specifically, the RAN may send the first indication information to the AMF in the process of suspending the UE.

Optionally, in other embodiments, the UE may also send the first indication information to the AFM. The AMF decides to switch the UE to the suspended state and initiates the release procedure, wherein in the release procedure, the AMF may instruct the RAN to switch the UE to the suspended state.

In S403, after receiving the first indication information of the UE or receiving the indication of the AMF to suspend the UE, the RAN switches the UE to the suspended state. Optionally, the RAN may release the RRC connection, the N2 connection, and the N3 connection of the UE.

Optionally, in S404, the RAN may send the first signaling to the UE, such as a RRC signaling, and switch the state of the UE in the first network from the active state to the suspended state according to the first signaling.

Here, for information included in the first signaling, related description of the information included in the first signaling in S204 in the first embodiment shown in FIG. 3 can be referred to, which is not elaborated here.

In S405, the UE is maintained in the suspended state in the first network.

When the UE is in the suspended state, the UE may determine whether to monitor a paging message in the first network according to the second indication information in the first signaling, and determine whether to send a notification message to the network device in the first network when returning to the first network according to the third indication information in the first signaling.

In S406 to S407, when the downlink data arrives, the UPF informs the SMF, and further, the SFM informs the AMF. Optionally, service attribute information of the downlink data is carried therein. For specific contents of the service attribute information of the downlink data, related description of the second embodiment shown in FIG. 4 can be referred to, which is not elaborated here.

In S408, after receiving the downlink data, the AMF may determine whether a paging message needs to be sent to the UE.

That is, in the third embodiment, the core network may determine the paging mechanism of the terminal device. For example, it may be determined whether to send a first class paging message, or whether to send a second class paging message, or whether to send a first class paging message or a second class paging message.

In mode 1, the AMF determines whether to send a first class paging message.

Optionally, the AMF may determine whether to send the first class paging message according to whether the UE returns to the first network, the information of the service expected to be paged in the first network by the UE, the priorities of the first network and the second network, the service attribute of the downlink data, etc.

For example, it is determined the first class paging message is sent when the UE is available, and otherwise, the first class paging message is not sent. Alternatively, the AMF may not make any decision and directly send the first class paging message after receiving the downlink data. Alternatively, the AMF may determine whether to send the first class paging message based on a timer. For example, during the running time of the timer, the first class paging message is not sent, and when the timer times out, the first class paging message is sent.

In another example, the AMF may determine to send the first class paging message, if the service attribute information of the downlink data is included in the information of the service expected to be paged in the first network by the UE, for example, the downlink data is the voice service and the type of the service expected to be paged in the first network by the terminal device includes the voice service, or if the latency requirement of the downlink data is higher than the latency information of the service expected to be paged by the terminal device. Otherwise, the first class paging message is not sent.

Optionally, for the way in which the AFM may determine the paging mechanism of the UE in mode 1, the implementation in which the RAN sends a paging message in the foregoing embodiments may also be referred to, which is not elaborated here.

If the AMF determines to send a first class paging message, the AMF may send a first class paging request information to the RAN in S409. Further, the RAN may send the first class paging message to the UE in S410. The first class paging message here may have the same format as an existing paging request message.

In mode 2, the AMF determines whether to send a second class paging message.

Optionally, the AMF may determine whether to send the second class paging message according to at least one of: whether a notification message that the UE returns to the first network is received, the priorities of the first network and the second network, information of the service expected to be paged in the first network by the UE, service attribute information of the downlink data, and information of the service in the second network.

For example, if the AMF receives the notification message that the UE returns to the first network, the second class paging message is sent when the UE is available. Otherwise, the second class paging message is not sent when the UE is unavailable.

In another example, the AMF may also determine whether to send the second class paging message according to a timer. For example, during the running time of the timer, the AMF may consider the UE unavailable, and the second class paging message is not sent. When the timer times out, the AMF may consider the UE available, and the second class paging message starts to be sent.

In still another example, if the priority of the downlink data is higher than a specific priority threshold, or the downlink data is service of a specific type, such as voice service or emergency service, the AMF may determine to send the second class paging message.

In still another example, the AMF may determine to send the second class paging message, if the service attribute information of the downlink data is included in the information of the service expected to be paged in the first network by the UE, for example, the downlink data is the voice service and the type of the service expected to be paged in the first network by the terminal device includes the voice service, or if the latency requirement of the downlink data is higher than the latency information of the service expected to be paged by the terminal device. Otherwise, the second class paging message is not sent.

In still another example, the AMF may determine whether to send the second class paging message according to the priorities of the first network and the second network. For example, it is determined to send the second class paging message if the priority of the first network is higher than the priority of the second network. Otherwise, the second class paging message is not sent, or vice versa.

If the AMF determines to send the second class paging message, the AMF may send the second class paging request message to the RAN in S412, and further, the RAN may send the second class paging message to the UE in S413. Different from the first class paging request message, the second class paging request message may include the service attribute information of the downlink data. That is to say, the paging request message may be an enhanced paging request message.

In mode 3, the AMF may determine the type of the paging message to be sent.

Optionally, the AMF may determine to send the first class paging message or the second class paging message according to at least one of: whether a notification message that the UE returns to the first network is received, the priorities of the first network and the second network, information of the service expected to be paged in the first network by the UE, service attribute information of the downlink data, and information of the service in the second network.

For example, it is determined to send the second class paging message if the UE is unavailable. Alternatively, the first class paging message is sent when the UE is available. Further alternatively, it is determined to send the first class paging message if the UE is available, or the second class paging message is sent when the UE is unavailable.

As another example, the AMF may determine to send the first class paging message if the priority of the downlink data is higher than a specific priority threshold, or the downlink data is service of a specific type, such as voice service or emergency service. Otherwise, it is determined to send the second class paging message, or vice versa.

In the mode 3, for the sending way of the first class paging message and the second class paging message, related description of S409 to S413 can be referred to, which is not elaborated here.

For the UE, a paging message in the first network may be monitored. Alternatively, it may be determined whether a paging message in the first network needs to be monitored according to the second indication information in the first signaling. For example, the UE determines to monitor a paging message in the first network, if the second indication information indicates that a paging message in the first network does not need to be monitored. Otherwise, it is determined to monitor the paging message in the first network.

In mode 1, if the UE has monitored a first class paging message sent by the RAN, the UE may determine whether to reply a paging response message to the RAN further in S411.

In mode 2, if the UE has monitored a second class paging message sent by the RAN, the UE may determine whether to reply a paging response message to the RAN further in S412.

In mode 3, when having monitored a first class paging message or a second class paging message, the UE may further determine whether to reply a paging response message to the RAN.

Optionally, the UE may determine whether to reply the paging response message according to attributes such as the information of the service in the second network, the type of the received paging message, the information of the service expected to be paged in the first network by the UE, the priorities of the first network and the second network, and the like.

For example, if service transmission in the second network is not ended, the UE may determine not to reply a paging response message. Alternatively, the UE may also determine whether to reply a paging response message based on a timer. For example, during the running time of the timer, it may be considered that the service of the second network is not ended, and the paging response message is not replied. When the timer timers out, it may be considered that the service of the second network is ended, and the paging response message is replied.

In another example, if the service in the second network is high-priority service, and optionally, the priority of the high-priority service is higher than a specific priority threshold, such as emergency call service and voice service, etc., it is determined that the paging response message is not replied.

In still another example, the service in the second network is service of a specific type, such as voice service or emergency service, it is determined that the paging response message is not replied.

In still another example, the priority of the service in the second network is higher than that of the downlink data to be transmitted, it is determined that the paging response message is not replied.

In still another example, the priority of the second network is higher than that of the first network, and it is determined that the paging response message is not replied.

In still another example, if the received paging message is a first class paging message, the UE may determine to respond to the paging message. Alternatively, if the received paging message is a second class paging message, the UE may determine to respond to the paging message, or vice versa.

In still another example, if the information of the service expected to be paged in the first network by the terminal device does not include the service information of the downlink data to be transmitted, for example, the downlink data is video service, and the type of service expected to be paged in the first network by the terminal device does not include the video service, or if the latency requirement of the downlink data is lower than the latency information of the service expected to be paged by the terminal device, the terminal device may not reply the paging response message.

Further, if the AMF receives the paging response message of the UE, the AMF may determine that the UE returns to the first network. Because the contextual information of the UE is maintained not only at the UE side, but also at the access network side and the core network side, the UE may rapidly restore the network connections in the first network, thereby continuing to perform service transmission using the first network.

Optionally, after the UE returns to the first network, the AMF may instruct the RAN to switch the state of the UE in the first network from the suspended state to the active state.

Alternatively, if the AMF does not receive the paging response message of the UE in S415, it may be considered that the UE is unavailable, and further, the AMF may perform corresponding operations in S316.

In mode 1, the AMF initiates a detach procedure of the UE.

In mode 2, the AMF initiates the release procedure, releases the locally saved contextual information of the UE, instructs the RAN to release the contextual information of the UE, instructs the SMF to release the contextual information of the UE, and switches the UE to the idle state.

In mode 3, the contextual information of the UE is saved. Further, before the UE is available, the AMF does not send a paging message to the UE any more. Alternatively, the AMF may start a timer, and before the timer times out, the AMF does not send a paging message to the UE.

Figure 6:
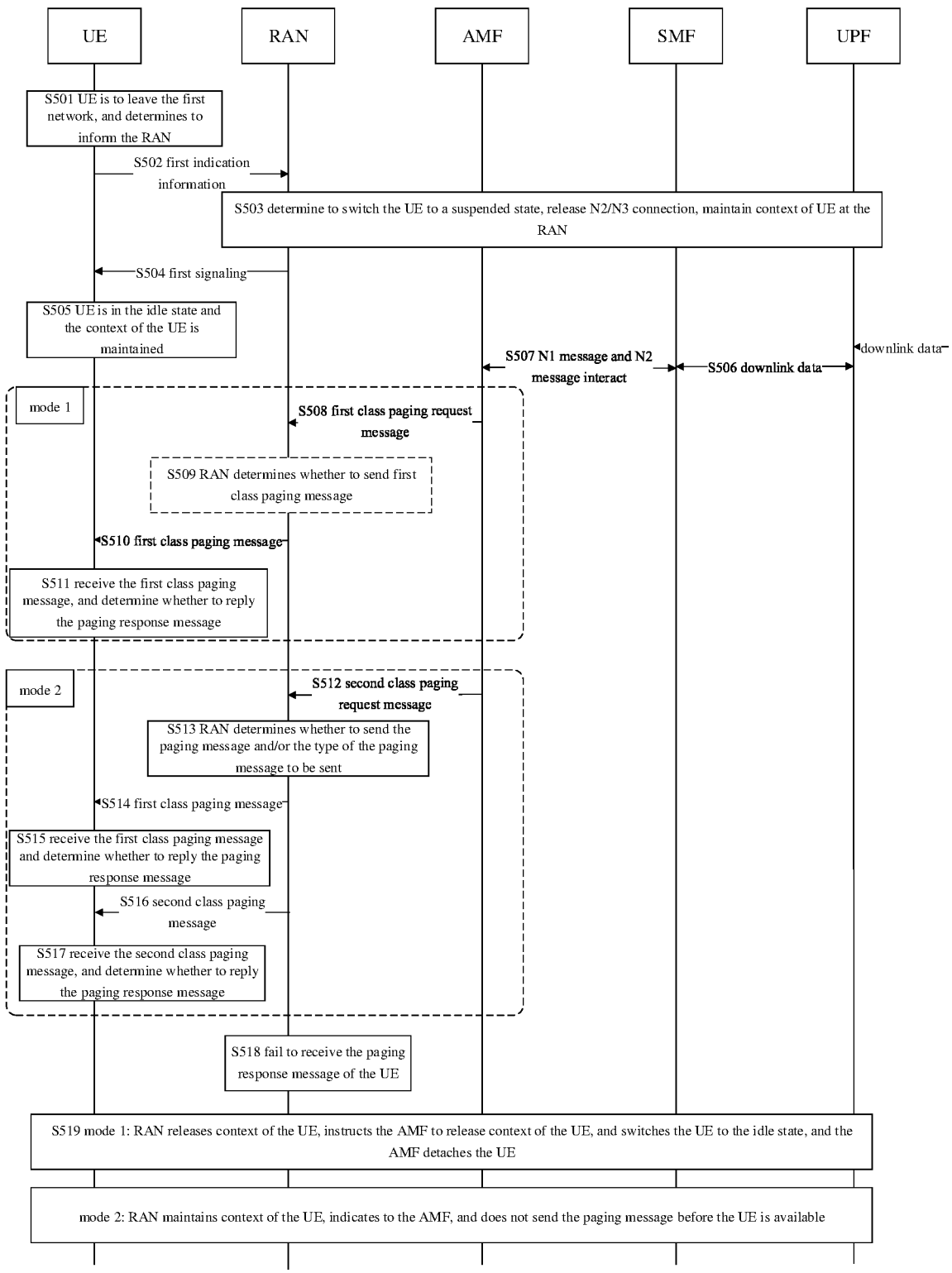
FIG. 6 is a schematic interaction diagram of a wireless communication method provided by an embodiment of the present application.

FIG. 6 is a schematic flow chart of a fourth embodiment of the present application. As shown in FIG. 6, the method may include the following.

In S501, the UE determines to be switched from the first network to the second network, and determines that the RAN needs to be informed.

S501 may correspond to S201 in the first embodiment shown in FIG. 3. For the specific implementation, related description of the foregoing embodiments can be referred to, which is not elaborated here.

In S502, the UE sends the first indication information to the RAN, where the first indication information is used for informing the RAN that the UE is to be switched from the first network to the second network.

S502 may correspond to S202 in the first embodiment shown in FIG. 3. For the specific implementations, related description of the foregoing embodiments can be referred to, which is not elaborated here.

In S503, after receiving the first indication information of the UE, the RAN determines to switch the UE to the suspended state, and release the RRC connection, N2 connection and N3 connection of the UE according to the first indication information.

As similar to S203, the UE may forward the first indication information to the RAN through the core network device, such as the AMF, and after receiving the first indication information, the AMF may send the first indication information to the RAN.

Optionally, in S504, the RAN may send the first signaling to the UE, such as the RRC signaling, and switch the state of the UE in the first network from the active state to the suspended state through the first signaling.

Here, for information included in the first signaling, specific description of the information included in the first signaling in S204 in the first embodiment shown in FIG. 3 can be referred to, which is not elaborated here.

In S505, the UE is maintained in the suspended state in the first network.

When the UE is in the suspended state, the UE may determine whether to monitor a paging message in the first network according to the second indication information in the first signaling, and determine whether to send a notification message to the network device in the first network when returning to the first network according to the third indication information in the first signaling.

In S506 to S507, when the downlink data arrives, the UPF informs the SMF, and further, the SFM informs the AMF. Optionally, the service attribute information of the downlink data is carried therein. For specific contents, related description of the second embodiment shown in FIG. 4 can be referred to, which is not elaborated here.

After receiving the downlink data, the AMF may send a paging request message to the RAN, where the paging request message may be a first class paging request message or a second class paging request message as mentioned previously, and the second class paging request message includes the service attribute information of the downlink data.

Mode 1:

In S08, after receiving the downlink data, the AMF sends a first class paging request message to the RAN.

In S509, the RAN determines whether to send a first class paging message.

Optionally, the RAN may determine whether to send the first class paging message according to whether the UE returns to the first network, the information of the service expected to be paged in the first network by the UE, the priorities of the first network and the second network, the service attribute of the downlink data, etc.

For example, it is determined that the first class paging message is sent when the UE is available. Otherwise, the first class paging message is not sent. Alternatively, the RAN may also determine whether to send the first class paging message based on a timer. For example, during the running time of the timer, the first class paging message is not sent, and when the timer times out, the first class paging message is sent.

In another example, the RAN may determine to send the first class paging message, if the service attribute information of the downlink data is included in the information of the service expected to be paged in the first network by the UE, for example, the downlink data is voice service and the type of the service expected to be paged in the first network by the terminal device includes voice service, or if the latency requirement of the downlink data is higher than the latency information of the service expected to be paged by the terminal device. Otherwise, the first class paging message is not sent.

Optionally, for the way in which the RAN may determine the paging mechanism of the UE in the mode 1, the implementation in which the RAN sends the paging message in the first embodiment and the second embodiment may also be referred to, which is not elaborated here.

If the RAN determines to send a first class paging message, the RAN may send the first class paging information to the UE in S510. Further, the UE may receive the first class paging message in S511, and then determines whether to send a paging response message.

Mode 2:

In S512, after receiving the downlink data, the AMF sends a second class paging request message to the RAN.

In S513, the RAN determines whether to send the paging message and/or the type of the paging message to be sent.

In mode 2.1, the RAN determines whether to send the first class paging message.

For specific implementation of mode 2.1, specific implementation of S509 may be referred to, which is not elaborated here.

In mode 2.2, the RAN may determine whether to send the second class paging message.

Optionally, the RAN may determine whether to send the second class paging message according to at least one of: whether a notification message that the UE returns to the first network is received, the priorities of the first network and the second network, information of the service expected to be paged in the first network by the UE, service attribute information of the downlink data, and information of the service in the second network.

For example, if the RAN receives a notification message that the UE returns to the first network, the RAN may send the second class paging message when the UE is available, or the RAN will not send the second class paging message when the UE is unavailable.

In another example, the RAN may also determine whether to send the second class paging message according to a timer. For example, during the running time of the timer, the AMF may consider the UE unavailable, and the second class paging message is not sent. When the timer times out, the AMF may consider the UE available, and the second class paging message starts to be sent.

In still another example, if the priority of the downlink data is higher than a specific priority threshold, or the downlink data is service of a specific type, such as voice service or emergency service, the RAN may determine to send the second class paging message.

In still another example, the RAN may determine to send the second class paging message, if the service attribute information of the downlink data is included in the information of the service expected to be paged in the first network by the UE, for example, the downlink data is voice service and the type of the service expected to be paged in the first network by the terminal device includes voice service, or if the latency requirement of the downlink data is higher than the latency information of the service expected to be paged by the terminal device. Otherwise, the second class paging message is not sent.

In still another example, the RAN may determine whether to send the second class paging message according to the priorities of the first network and the second network. For example, it is determined that the second class paging message is sent, if the priority of the first network is higher than the priority of the second network. Otherwise, the second class paging message is not sent, or vice versa.

In mode 2.3, the RAN may determine the type of the paging message to be sent.

Optionally, the RAN may determine to send the first class paging message or the second class paging message according to at least one of: whether a notification message that the UE returns to the first network is received, the priorities of the first network and the second network, information of the service expected to be paged in the first network by the UE, service attribute information of the downlink data, and information of the service in the second network.

For example, it is determined that the second class paging message is sent if the UE is unavailable. Alternatively, the first class paging message is sent when the UE is available. Further alternatively, it is determined that the first class paging message is sent if the UE is available, or the second class paging message is sent when the UE is unavailable.

In another example, the RAN may determine to send the first class paging message, if the priority of the downlink data is higher than a specific priority threshold, or the downlink data is service of a specific type, such as voice service or emergency service. Otherwise, it is determined that the second class paging message is sent, or vice versa.

In mode 2, if the RAN determines to send the first class paging message, the RAN send the first class paging message to the UE in S514. Further, the UE may receive the first class paging message in S515, and then determine whether to send the paging response message. Alternatively, if the RAN determines to send the second class paging message, the RAN send the second class paging message to the UE in S516. Further, the UE receives the second class paging message in S517, and then determines whether to send the paging response message.

Hereinafter, the specific implementations of S515 and S517 are described.

Optionally, the UE may determine whether to reply the paging response message according to attributes such as the information of the service in the second network, the type of the received paging message, the information of the service expected to be paged in the first network by the UE, the priorities of the first network and the second network, and the like.

For example, if the service transmission in the second network is not ended, the UE may determine not to reply the paging response message. Alternatively, the UE may also determine whether to reply the paging response message based on a timer. For example, during the running time of the timer, it may be considered that the service in the second network is not ended, and the paging response message is not replied. When the timer times out, it may be considered that the service in the second network is ended, the paging response message is replied.

In another example, if the service in the second network is high-priority service, and optionally, the priority of the high-priority service is higher than a specific priority threshold, such as emergency call service and voice service, etc., it is determined that the paging response message is not replied.

In still another example, the service in the second network is service of a specific type, such as voice service or emergency service, and it is determined that the paging response message is not replied.

In still another example, the priority of the service in the second network is higher than that of the downlink data to be transmitted, and it is determined that the paging response message is not replied.

In still another example, the priority of the second network is higher than that of the first network, and it is determined that the paging response message is not replied.

In still another example, the UE may determine to respond to the paging message, if the received paging message is the first class paging message. Alternatively, the UE may determine respond to the paging message, if the received paging message is the second class paging message, or vice versa.

In still another example, if the information of the service expected to be paged in the first network by the terminal device does not include the service information of the downlink data to be transmitted, for example, the downlink data is the video service, and the type of service expected to be paged in the first network by the terminal device does not include the video service, or if the latency requirement of the downlink data is lower than the latency information of the service expected to be paged by the terminal device, the terminal device may not reply the paging response message.

Further, if the RAN receives the paging response message of the UE, the RAN may determine that the UE returns to the first network. Because the contextual information of the UE is maintained not only at the UE side, but also at the access network side and the core network side, the UE may rapidly restore the network connections in the first network, thereby continuing to perform service transmission using the first network.

Optionally, after the UE returns to the first network, the RAN may switch the state of the UE in the first network from the suspended state to the active state.

Alternatively, if the RAN does not receive the paging response message of the UE in S518, it may be considered that the UE is unavailable, and further, the RAN may perform corresponding operations in S519.

In mode 1, the RAN initiates the release procedure, locally releases the context of the UE, and switches the UE to the idle state. Optionally, the AFM may detach the UE. For example, the RAN may instruct the AMF to detach the UE.

In mode 2, the RAN maintains the context of the UE, indicates it to the AFM, and the AMF also maintains the context of the UE. Before the UE is available, the paging message is not sent. Optionally, before receiving the notification message or the available message that the UE returns to the first network, the RAN does not send the paging message to the UE any more. Optionally, the RAN may also start a timer, and before the timer times out, the RAN does not send the paging message to the UE.

Therefore, according to the wireless communication method of an embodiment of the present application, when the terminal device is to be switched from the first network to the second network, the terminal device may send the indication information to a network device in the first network, so as to indicate that the terminal device is to be switched form the first network to the second network. Further, the network device in the first network may switch the state of the terminal device in the first network from the active state to the inactive state or the suspended state. Thus, when the terminal device is switched back to the first network, the terminal device may continue performing service transmission using a previously established network connection, or may rapidly restore the network connection of the terminal device in the first network. This is beneficial to avoid interruption of the service transmission, thus improving user experience.

The method embodiments according to embodiments of the present application are described above from the perspective of device interaction in combination with FIG. 2 to FIG. 6. Hereinafter, the apparatus embodiments of the present application will be described in detail in combination with FIG. 7 to FIG. 12. It should be understood that the apparatus embodiments are corresponding to the method embodiments respectively, and for the similar description, the method embodiments may be referred to.

Figure 7:
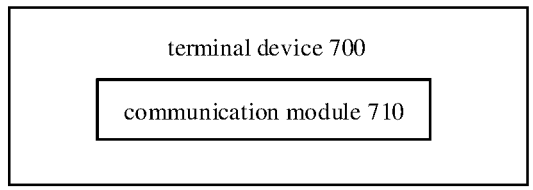
FIG. 7 is a schematic block diagram of a terminal device provided by an embodiment of the present application.

FIG. 7 shows a schematic block diagram of the terminal device 700 according to an embodiment of the present application. As show in FIG. 4, the terminal device 700 includes:

a communication module 710, configured to send first indication information to a first network device, where the first indication information indicates that the terminal device is to be switched from a first network or system to a second network or system, and the first network device is an access network device or a core network device in the first network or system.

Optionally, in some embodiments, the first indication information includes at least one of: information of a state expected to be in the first network or system by the terminal device, information that the terminal device is switched to the second network or system for service transmission, information of a service transmitted by the terminal device when switched to the second network or system, information of a duration when the terminal device performs service transmission in the second network or system, and information of a service expected to be paged in the first network by the terminal device.

Optionally, in some embodiments, the information of the service transmitted by the terminal device when switched to the second network or system includes type information of the service and/or quality of service (QoS) information of the service. The information of the service expected to be paged in the first network by the terminal device may be type information of the service expected to be paged and/or QoS information of the service.

Optionally, in some embodiments, the type information of the service includes at least one of: voice service, short message service, emergency service, and high-priority service.

Optionally, in some embodiments, the QoS information of the service includes at least one of: 5G QoS Indicator (5QI), latency information, and reliability information.

Optionally, in some embodiments, if the first network device is the access network device in the first network or system, the communication module is specifically configured to:

send the first indication information to the first network device through a first core network device, where the first core network device is a core network device in the first network or system.

Optionally, in some embodiments, if the first network device is the access network device in the first network or system, the communication module is further configured to:

receive a first signaling sent by the first network device, where the first signaling is used for switching the state of the terminal device in the first network or system from an active state to an inactive state or a suspended state.

Optionally, in some embodiments, if the state of the terminal device is the inactive state, network connections of the terminal device with a core network side and an access network side in the first network or system are maintained, and contextual information of the terminal device in the first network or system is maintained not only at the core network side and the access network side of the first network or system but also at a terminal device side.

Alternatively, if the state of the terminal device is the suspended state, the network connections of the terminal device with the core network side and the access network side in the first network or system are released, and the contextual information of the terminal device in the first network or system is maintained not only at the core network side and the access network side of the first network or system but also at the terminal device side.

Optionally, in some embodiments, the first signaling includes at least one of: time information; second indication information, used for indicating whether the terminal device in the inactive state or the suspended state needs to monitor a paging message in the first network or system; and third indication information, used for indicating whether the terminal device needs to send a notification message to the network device in the first network or system when switched to the first network or system.

Optionally, in some embodiments, the time information is information of time when the terminal device is maintained in the inactive state or the suspended state.

Optionally, in some embodiments, the terminal device further includes: a processing module, configured to start a first timer according to the time information. If the first timer times out, and the terminal device does not return to the first network or system, the contextual information of the terminal device in the first network or system is released, and the state of the terminal device in the first network or system is switched to an idle state.

Optionally, in some embodiments, the time information is information of time for monitoring a paging message by the terminal device.

Optionally, in some embodiments, the terminal device further includes: a processing module, configured to start a second timer according to the time information. The communication module is further configured to start monitoring the paging message in the first network or system when the second timer times out.

Optionally, in some embodiments, the terminal device further includes: a determination module, configured to determine whether to monitor the paging message in the first network or system according to the second indication information.

Optionally, in some embodiments, the terminal device further includes: a determination module, configured to determine whether to send the notification message to the first network device according to the third indication information, if the terminal device is switched back to the first network or system.

Optionally, in some embodiments, the communication module is further configured to: receive a paging message sent by the first network device.

Optionally, in some embodiments, the type of the paging message is a first class paging message or a second class paging message, and the second class paging message includes attribute information of downlink data to be transmitted.

Optionally, in some embodiments, service attribute information of the downlink data comprises at least one of: protocol data unit (PDU) session information, QoS flow information, data radio bearers (DRB) information, and 5QI information of the downlink data.

Optionally, in some embodiments, the terminal device further includes: a determination module, configured to determine whether to reply a paging response message to the first network device.

Optionally, in some embodiments, the determination module is specifically configured to: determine whether to reply the paging response message according to at least one of:

information of the service in the second network or system, type information of the paging message, service attribute information of the downlink data in the paging message, and priorities of the first network or system and the second network or system.

Optionally, in some embodiments, the determination module is specifically configured to: if service transmission of the terminal device in the second network or system is not ended, determine not to reply the paging response message; or if the priority of the service of the terminal device in the second network or system is higher than a specific priority threshold, determine not to reply the paging response message.

Optionally, in some embodiments, the determination module is specifically configured to: if the paging message is the second class paging message, determine to reply the paging response message; or if the paging message is the first class paging message, determine to rely the paging response message.

Optionally, in some embodiments, the determination module is specifically configured to: if the priority of the service of the terminal device in the second network or system is higher than that of the downlink data, determine not to reply the paging response message; or if the priority of the second network or system is higher than that of the first network or system, determine not to reply the paging response message.

Optionally, in some embodiments, the priorities of the first network or system and the second network or system are determined by subscription information of the terminal device, or configured by a network device, or pre-configured.

Optionally, the plurality of networks is networks corresponding to multiple modes supported by the terminal device.

It should be understood that the terminal device 700 according to an embodiment of the present application may correspond to the terminal device or UE in the method embodiments of the present application. The foregoing and other operation and/or function of each unit in terminal device 700 are for implementing the corresponding processes of the terminal device in the method embodiments shown in FIG. 2 to FIG. 6 respectively, which is not elaborated for simplicity.

Figure 8:
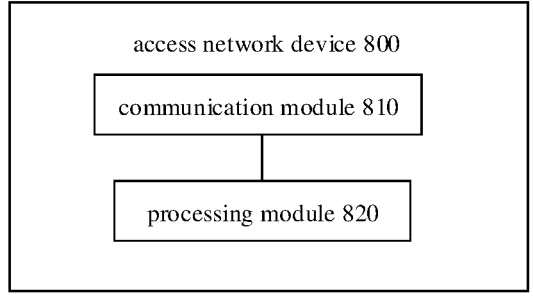
FIG. 8 is a schematic block diagram of an access network device provided by an embodiment of the present application.

FIG. 8 is a schematic block diagram of the access network device according to an embodiment of the present application. The access network device 800 shown in FIG. 8 includes: a communication module 810, configured to receive first indication information sent by a terminal device, where the first indication information is used for indicating that the terminal device is to be switched from a first network or system to a second network or system, and the access network device is an access network device in the first network or system; and a processing module 820, configured to switch the state of the terminal device in the first network or system from an active state to an inactive state or a suspended state.

Optionally, in some embodiments, the first indication information includes at least one of: information of the state expected to be in the first network or system by the terminal device, information that the terminal device is switched to the second network or system for service transmission, information of the service transmitted by the terminal device when switched to the second network or system, information of a duration when the terminal device performs service transmission in the second network or system, and information of the service expected to be paged in the first network by the terminal device.

Optionally, in some embodiments, the information of the service transmitted by the terminal device when switched to the second network or system includes type information of the service and/or quality of service (QoS) information of the service, and the information of the service expected to be paged in the first network by the terminal device may be type information of the service expected to be paged and/or QoS information of the service.

Optionally, in some embodiments, the type information of the service includes at least one of: voice service, short message service, emergency service, and high-priority service.

Optionally, in some embodiments, the QoS information of the service includes at least one of: 5G QoS indicator (5QI), latency information, and reliability information.

Optionally, in some embodiments, the communication module is specifically configured to: receive the first indication information sent by the terminal device through a first core network device, where the first core network device is a core network device in the first network or system.

Optionally, in some embodiments, the communication module is further configured to: send a first signaling to the terminal device, where the first signaling is used for switching the state of the terminal device in the first network or system from the active state to the inactive state or the suspended state.

Optionally, in some embodiments, if the state of the terminal device is the inactive state, network connections of the terminal device with a core network side and an access network side in the first network or system are maintained, and contextual information of the terminal device in the first network or system is maintained not only at the core network side and the access network side of the first network or system but also at the terminal device side.

Alternatively, if the state of the terminal device is the suspended state, the network connections of the terminal device with the core network side and the access network side in the first network or system are released, and the contextual information of the terminal device in the first network or system is maintained not only at the core network side and the access network side of the first network or system but also at the terminal device side.

Optionally, in some embodiments, the first signaling includes at least one of: time information; second indication information, used for indicating whether the terminal device in the inactive state or the suspended state needs to monitor a paging message in the first network or system; and third indication information, used for indicating whether the terminal device needs to send a notification message to the network device in the first network or system when switched back to the first network or system.

Optionally, in some embodiments, the time information is information of time when the terminal device is maintained in the inactive state or the suspended state.

Optionally, in some embodiments, the processing module is further configured to start a third timer according to the time information. If the third timer times out, the notification message that the terminal device is switched back to the first network or system is not received, and the terminal device is in the inactive state, the contextual information of the terminal device in the first network or system is released, and network connections of the terminal device with the access network side and the core network side in the first network or system are released. Alternatively, if the third timer times out, the notification message that terminal device is switched back to the first network or system is not received, and the terminal device is in the suspended state, the contextual information of the terminal device in the first network or system is released.

Optionally, in some embodiments, the time information is information of time for monitoring a paging message by the terminal device.

Optionally, in some embodiments, the processing module is further configured to determine whether to send to the terminal device the paging message and/or the type of the paging message to be sent.

Optionally, in some embodiments, the processing module is specifically configured to determine whether to send the paging message and/or the type of the paging message to be sent according to at least one of: time information in the first signaling; whether a notification message sent by the terminal device indicating return to the first network or system is received; and attribute information of downlink data to be transmitted in the first network or system.

Optionally, in some embodiments, the type of the paging message includes a first class paging message and a second class paging message, and the second class paging message includes the attribute information of the downlink data to be transmitted.

Optionally, in some embodiments, the processing module is specifically configured to: if the notification message sent by the terminal device is not received, determine not to send the first class paging message; or if the notification message sent by the terminal device is received, determine to send the first class paging message.

Optionally, in some embodiments, the processing module is specifically configured to: if the notification message sent by the terminal device is not received, determine not to send the second class paging message; or if the notification message sent by the terminal device is received, determine to send the second class paging message.

Optionally, in some embodiments, the processing module is specifically configured to: determine to send the second class paging message before a fourth timer times out; or determine to send the first class paging message when the fourth timer times out, where duration of the fourth timer is determined according to the time information.

Optionally, in some embodiments, the processing module is specifically configured to: if the priority of the downlink data to be transmitted is higher than a specific priority threshold, determine to send the second class paging message; or if the priority of the downlink data to be transmitted is higher than a specific priority threshold, determine to send the first class paging message.

Optionally, in some embodiments, the communication module is further configured to: receive a paging request message sent by a first core network device, where the paging request message is used for instructing the access network device to initiate the paging message to the terminal device, and the first core network device is a core network device in the first network or system.

Optionally, in some embodiments, the paging request message is a first class paging request message or a second class paging request message, and the second class paging request message includes the attribute information of the downlink data to be transmitted.

Optionally, in some embodiments, the first core network device is an access management function (AMF) entity or a mobility management network element (MME).

Optionally, in some embodiments, service attribute information of the downlink data includes at least one of: protocol data unit (PDU) session information, QoS flow information, data radio bearers (DRB) information, and 5QI information of the downlink data.

Optionally, in some embodiments, the processing module is further configured to:

if the state of the terminal device in the first network or system is the inactive state, and a paging response message replied by the terminal device is not received, release contextual information of the terminal device in the first network or system, and release connection of the terminal device with a core network side.

Optionally, in some embodiments, the processing module is further configured to:

if the state of the terminal device in the first network or system is the suspended state, and a paging response message replied by the terminal device is not received, release contextual information of the terminal device in the first network or system.

Optionally, in some embodiments, the processing module is further configured to:

instruct a core network device in the first network or system to release the contextual information of the terminal device in the first network or system.

Optionally, in some embodiments, the communication module is further configured to send the cached downlink data back to a user plane function (UPF) entity in the first network or system; and the processing module is further configured to discard the downlink data.

Optionally, in some embodiments, the processing module is further configured to:

if the access network device does not receive a paging response message replied by the terminal device, maintain the state of the terminal device in the first network or system in the inactive state or the suspended state by the access network device.

It should be understood that access network device 800 according to an embodiment of the present application may correspond to the first access network device in the method embodiments of the present application. The foregoing and other operation and/or function of each unit in the access network device 800 are for implementing the corresponding processes of the first access network device in the method embodiments shown in FIG. 3 to FIG. 6 respectively, which is not elaborated here for simplicity.

Figure 9:
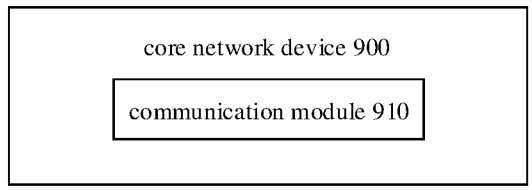
FIG. 9 is a schematic block diagram of a core network device provided by an embodiment of the present application.

FIG. 9 is a schematic block diagram of the core network device according to an embodiment of the present application. The core network device 900 in FIG. 9 includes: a communication module 910, configured to receive first indication information sent by a terminal device, where the first indication information is used for indicating that the terminal device is to be switched from a first network or system to a second network or system, and the core network device is a core network device in the first network or system.

Optionally, in some embodiments, the first indication information includes at least one of: information of the state expected to be in the first network or system by the terminal device, information that the terminal device is switched to the second network or system for service transmission, information of the service transmitted by the terminal device when switched to the second network or system, information of a duration when the terminal device performs service transmission in the second network or system, and information of the service expected to be paged in the first network by the terminal device.

Optionally, in some embodiments, the information of the service transmitted by the terminal device when switched to the second network or system includes type information of the service and/or quality of service (QoS) information of the service; and the information of the service expected to be paged in the first network by the terminal device may be type information of the service expected to be paged and/or QoS information of the service.

Optionally, in some embodiments, the type information of the service includes at least one of: voice service, short message service, emergency service, and high-priority service.

Optionally, in some embodiments, the QoS information of the service includes at least one of: 5G QoS Indicator (5QI), latency information, and reliability information.

Optionally, in some embodiments, the communication module is further configured to: send indication information to a first access network device, where the first access network device is an access network device in the first network or system, and the indication information is used for instructing the first access network device to switch the state of the terminal device in the first network or system from the active state to the inactive state or the suspended state.

Optionally, in some embodiments, the core network device further includes:

a determination module, configured to determine whether to send to the terminal device a paging message and/or the type of the paging message to be sent.

Optionally, in some embodiments, the determination module is specifically configured to determine whether to send the paging message and/or the type of the paging message to be sent according to at least one of: whether a notification message sent by the terminal device indicating return to the first network or system is received; and attribute information of downlink data to be transmitted in the first network or system.

Optionally, in some embodiments, the type of the paging message includes a first class paging message and a second class paging message, and the second class paging message includes the attribute information of the downlink data to be transmitted.

Optionally, in some embodiments, the determination module is specifically configured to: if the notification message sent by the terminal device is not received, determine not to send the first class paging message; or if the notification message sent by the terminal device is received, determine to send the first class paging message.

Optionally, in some embodiments, the determination module is specifically configured to: if the notification message sent by the terminal device is not received, determine not to send the second class paging message; or if the notification message sent by the terminal device is received, determine to send the second class paging message.

Optionally, in some embodiments, the determination module is further configured to: if the priority of the downlink data to be transmitted is higher than a specific priority threshold, determine to send the second class paging message; or if the priority of the downlink data to be transmitted is higher than a specific priority threshold, determine to send the first class paging message.

Optionally, in some embodiments, service attribute information of the downlink data includes at least one of: protocol data unit (PDU) session information, QoS flow information, data radio bearers (DRB) information, and 5QI information of the downlink data.

Optionally, in some embodiments, the core network device further includes: a processing module, configured to initiate a detach procedure if a paging response message replied by the terminal device is not received.

Optionally, in some embodiments, the core network device further includes: a processing module, configured to release contextual information of the terminal device in the first network or system and instruct an access network device in the first network or system to release contextual information of the terminal device in the first network or system, if a paging response message replied by the terminal device is not received.

Optionally, in some embodiments, the core network device further includes: a processing module, configured to maintain contextual information of the terminal device in the first network or system, if a paging response message replied by the terminal device is not received.

Optionally, in some embodiments, the communication module is further configured to send a paging request message to a first access network device, where the paging request message is used for instructing the first access network device to initiate a paging message to the terminal device.

Optionally, in some embodiments, the paging request message is a first class paging request message or a second class paging request message, and the second class paging request message includes attribute information of downlink data to be transmitted.

Optionally, in some embodiments, the core network device is an access management function (AMF) entity or a mobility management network element (MME).

It should be understood that the core network device 700 according to an embodiment of the present application may correspond to the first core network device or the AMF in the method embodiments of the present application. The foregoing and other operation and/or function of each unit in the core network device 700 are for implementing the corresponding processes of the core network device in the method embodiments shown in FIG. 3 to FIG. 6 respectively, which is not elaborated for simplicity.

Figure 10:
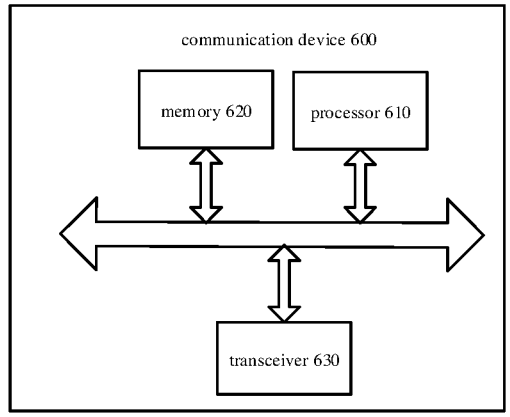
FIG. 10 is a schematic block diagram of a communication device provided by another embodiment of the present application.

FIG. 10 is a schematic structural diagram of a communication device 600 provided by an embodiment of the present application. The communication device 600 shown in FIG. 10 includes a processor 610, where the processor 610 may call and run a computer program from a memory to implement the method in an embodiment of the present application.

Optionally, as shown in FIG. 10, the communication device 600 may further include a memory 620. The processor 610 may call and run a computer program from the memory 620 to implement the method in an embodiment of the present application.

The memory 620 may be one separate device independent of processor 610, or may be integrated into the processor 610.

Optionally, as shown in FIG. 10, the communication device 600 may further include a transceiver 630, and the processor 610 may control the transceiver 630 to communicate with other device. Specifically, information or data may be sent to or received from other device.

The transceiver 630 may include a transmitter and a receiver. The transceiver 630 may further include an antenna, and the number of antennas may be one or more.

Optionally, the communication device 600 may specifically be the network device of an embodiment of the present application, and the communication device 600 may implement the corresponding processes implemented by the network device in the method of an embodiment of the present application, which is not elaborated here for simplicity.

Optionally, the communication device 600 may specifically be the mobile terminal/terminal device of an embodiment of the present application, and the communication device 600 may implement the corresponding processes implemented by the mobile terminal/terminal device in the method of an embodiment of the present application, which is not elaborated here for simplicity.

Figure 11:
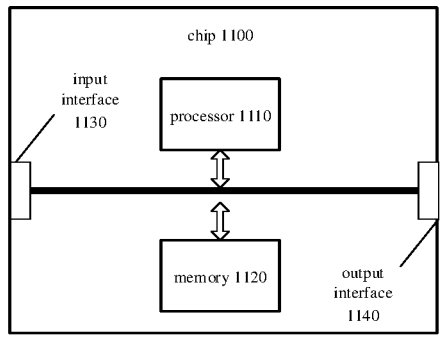
FIG. 11 is a schematic block diagram of a chip provided by an embodiment of the present application.

FIG. 11 is a schematic structural diagram of a chip of an embodiment of the present application. The chip 1100 shown in FIG. 11 includes a processor 1110, and the processor 1110 may call and run a computer program from a memory to implement the method in an embodiment of the present application.

Optionally, as shown in FIG. 11, the chip 1100 may further include a memory 1120. The processor 1110 may call and run the computer program from the memory 1120 to implement the method in an embodiment of the present application.

The memory 1120 may be one separate device independent of the processor 1110, or may be integrated into the processor 1110.

Optionally, the chip 1100 may also include an input interface 1130. The processor 1110 may control the input interface 1130 to communicate with other device or chip. Specifically, information or data sent by other device or chip may be obtained.

Optionally, the chip 1100 may also include an output interface 1140. The processor 1110 may control the output interface 1140 to communicate with other device or chip. Specifically, information or data may be output to other device or chip.

Optionally, the chip is applicable to the network device in an embodiment of the present application, and the chip may implement the corresponding processes implemented by the network device in the method of an embodiment of the present application, which is not elaborated here for simplicity.

Optionally, the chip is applicable to the mobile terminal/terminal device in an embodiment of the present application, and the chip may implement the corresponding processes implemented by the mobile terminal/terminal device in the method of an embodiment of the present application, which is not elaborated here for simplicity.

It should be understood that the chip mentioned in an embodiment of the present application may also be referred to as a system-level-chip, a system chip, a chip system, or a system-on-chip, etc.

Figure 12:
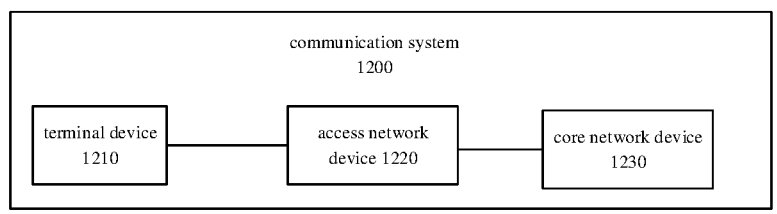
FIG. 12 is schematic block diagram of a communication system according to an embodiment of the present application.

FIG. 12 is a schematic block diagram of a communication system 1200 provided by an embodiment of the present application. As shown in FIG. 12, the communication system 1200 includes a terminal device 1210, an access network device 1220, and a core network device 1230.

The terminal device 1210 may be configured to realize the corresponding functions realized by the terminal device in the foregoing methods, the access network device 1220 may be configured to realize the corresponding functions realized by the access network device in the foregoing methods, and the core network device 1230 may be configured to realize the corresponding functions realized by the core network device in the foregoing methods, which is not elaborated here for simplicity.

It should be understood that the processor of an embodiment of the present application may be a type of integrated circuit chip, with the signal processing capability. In the implementation process, each step of the foregoing method embodiments may be completed through integrated logic circuits of hardware or instructions in the form of software in the processor. The foregoing processor may be a general-purpose processor, a Digital Signal Processor (DSP), an Application Specific Integrated Circuit (ASIC), a Field Programmable Gate Array (FPGA) or other programmable logic devices, discrete gates or transistor logic devices, discrete hardware components. Each method, step and logic block diagram disclosed in embodiments of the present application may be implemented or performed. The general-purpose processor may be a microprocessor, or the processor may also be any conventional processor, etc. Steps of the methods disclosed in combination with embodiments of the present application may be directly completed by a hardware decoding processor, or completed by a combination of hardware and a software module in the decoding processor. The software module may be located in a mature storage medium in the field such as a random access memory, a flash memory, a read-only memory, a programmable ROM or an electrically EPROM, a register or the like. The storage medium is located in the memory, and the processor reads information in the memory so as to complete the steps of the foregoing methods in conjunction with its hardware.

It may be understood that the memory in an embodiment of the present application may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), and it is used as an external cache. By the way of example but not limitative illustration, many forms of RAM are available, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described herein is intended to include, but not limited to, these and any other suitable types of memories.

It should be understood that the foregoing memories are exemplary but not limitative illustration. For example, the memory in an embodiment of the present application may also be a static RAM (SRAM), a dynamic RAM (DRAM), a synchronous DRAM (SDRAM), a double data rate SDRAM (DDR SDRAM), an enhanced SDRAM (ES-DRAM), a synch link DRAM (SLDRAM), and a Direct Rambus RAM (DR RAM), etc. That is to say, the memory in an embodiment of the present application is intended to include, but not limited to, these and any other suitable types of memories.

Embodiments of the present application further provide a computer-readable storage medium for storing a computer program.

Optionally, the computer-readable storage medium is applicable to the network device in an embodiment of the present application, and the computer program causes a computer to perform the corresponding processes implemented by the network device in the method of an embodiment of the present application, which is not elaborated here for simplicity.

Optionally, the computer-readable storage medium is applicable to the mobile terminal/terminal device in an embodiment of the present application, and the computer program causes a computer to perform the corresponding processes implemented by the mobile terminal/terminal device in the method of an embodiment of the present application, which is not elaborated here for simplicity.

Embodiments of the present application also provide a computer program product, including a computer program instruction.

Optionally, the computer program product is applicable to the network device in an embodiment of the present application, and the computer program instruction causes a computer to perform the corresponding processes implemented by the network device in the method of an embodiment of the present application, which is not elaborated here for simplicity.

Optionally, the computer program product is applicable to the mobile terminal/terminal device in an embodiment of the present application, and the computer program instruction causes a computer to perform the corresponding processes implemented by the mobile terminal/terminal device in the method of an embodiment of the present application, which is not elaborated here for simplicity.

Embodiments of the present application also provide a computer program.

Optionally, the computer program is applicable to the network device in an embodiment of the present application. When the computer program is run on a computer, the computer is caused to perform the corresponding processes implemented by the network device in the method of an embodiment of the present application, which is not elaborated here for simplicity.

Optionally, the computer program is applicable to the mobile terminal/terminal device in an embodiment of the present application. When the computer program is run on a computer, the computer is caused to perform the corresponding processes implemented by the mobile terminal/terminal device in the method of an embodiment of the present application, which is not elaborated here for simplicity.

Those of ordinary skilled in the art may realize that the unit and algorithm step of each example described in conjunction with embodiments disclosed herein can be implemented with electronic hardware, or a combination of computer software and electronic hardware. Whether these functions are performed by hardware or software depends on the specific application and design constraint of the technical solution. Professionals may use a different method to realize the described function for each specific application, but such implementation should not be considered beyond the scope of the present application.

Those of skilled in the art may clearly understand that for the convenience and simplicity of the description, for the specific working process of the systems, apparatuses and units described above, the corresponding process in the foregoing method embodiments may be referred to, which is not be elaborated here.

In several embodiments provided by the present application, it should be understood that the system, apparatus and method disclosed may be implemented in other ways. For example, the apparatus embodiments described above are merely exemplary. For example, division of the units is only a type of logical function division, and there may be other division ways in actual implementation.

For example, a plurality of units or components may be combined or integrated into another system, or some features may be ignored or not performed. On the other hand, a mutual coupling, a direct coupling, or a communication connection displayed or discussed may be an indirect coupling or a communication connection through some interfaces, apparatuses or units, and may be electrical, mechanical or in other form.

The unit illustrated as a separate component may or may not be physically separate, and a component displayed as a unit may or may not be a physical unit. That is, it may be located in one place or may also be distributed onto a plurality of network units. Some or all of the units may be selected according to the actual need so as to achieve the objective of the solution of the present embodiments.

In addition, each functional unit in each embodiment of the present application may be integrated into one processing unit. Alternatively, it may be that each unit exists alone physically, or it may be that two or more units are integrated into one unit.

The function may also be stored in a computer-readable storage medium if being realized in the form of a software functional unit and sold or used as an independent product. Based on such understanding, the essence of the technical solution of the present application or the part contributing to the related art or part of the technical solution may be embodied in the form of a software product. The computer software product is stored in the storage medium including several instructions such that a computer device (which may be a personal computer, a server, or a network device, etc.) executes all or part of the steps of the method described in each embodiment of the present application. The aforementioned storage medium includes a U disk, a mobile hard disk, a Read-Only Memory (ROM), a Random Access Memory (RAM), a magnetic disk or an optical disk, and other mediums that can store program codes.

The foregoing descriptions are merely specific implementations of embodiments of the present application, and the protection scope of the present application is not limited thereto. Any person skilled in the art can easily think of changes or substitutions within the technical scope disclosed in the present application, and all the changes or substitutions should be covered in the protection scope of the present application. Therefore, the protection scope of the present application should be subject to the protection scope of the claims.

What is claimed is:

1. A wireless communication method, comprising:
sending, by a terminal device, first indication information to a first network device, wherein the first indication information indicates that the terminal device is to be switched from a first network or system to a second network or system, and the first network device is an access network device or a core network device in the first network or system; and
receiving, by the terminal device, a paging message sent by the first network device,
wherein a type of the paging message is a second class paging message, and the second class paging message comprises attribute information of downlink data to be transmitted; and
wherein the first indication information comprises information of a state expected to be in the first network or system by the terminal device.

2. The method according to claim 1, wherein the first network device is the access network device in the first network or system, and the sending, by the terminal device, the first indication information to the first network device, comprises:
sending, by the terminal device, the first indication information to the first network device through a first core network device, wherein the first core network device is a core network device in the first network or system.

3. The method according to claim 1, wherein the method further comprises:
determining, by the terminal device, whether to reply a paging response message to the first network device.

4. The method according to claim 3, wherein the determining, by the terminal device, whether to reply the paging response message to the first network device, comprises:
determining, by the terminal device, whether to reply the paging response message according to at least one of: information of service in the second network or system, type information of the paging message, service attribute information of the downlink data in the paging message, or priorities of the first network or system and the second network or system.

5. The method according to claim 4, wherein the determining, by the terminal device, whether to reply the paging response message according to at least one of: information of service in the second network or system, type information of the paging message, service attribute information of the downlink data in the paging message, or priorities of the first network or system and the second network or system, comprises:
in response that service transmission of the terminal device in the second network or system is not ended, determining, by the terminal device, not to reply the paging response message; or in response that the priority of service of the terminal device in the second network or system is higher than a specific priority threshold, determining, by the terminal device, not to reply the paging response message.

6. The method according to claim 4, wherein the determining, by the terminal device, whether to reply the paging response message according to at least one of: information of service in the second network or system, type information of the paging message, service attribute information of the downlink data in the paging message, or priorities of the first network or system and the second network or system, comprises:

in response that the paging message is the second class paging message, determining, by the terminal device, to reply the paging response message; or in response that the paging message is the first class paging message, determining, by the terminal device, to reply the paging response message.

7. The method according to claim 4, wherein the determining, by the terminal device, whether to reply the paging response message according to at least one of: information of service in the second network or system, type information of the paging message, service attribute information of the downlink data in the paging message, or priorities of the first network or system and the second network or system, comprises:

in response that the priority of service of the terminal device in the second network or system is higher than the priority of the downlink data, determining, by the terminal device, not to reply the paging response message; or in response that the priority of the second network or system is higher than the priority of the first network or system, determining, by the terminal device, not to reply the paging response message.

8. A terminal device, comprising: a processor and a memory, wherein the memory is configured to store a computer program, and the processor is configured to call and run the computer program stored in the memory so as to perform wireless communication method, comprising:

sending, by the terminal device, first indication information to a first network device, wherein the first indication information indicates that the terminal device is to be switched from a first network or system to a second network or system, and the first network device is an access network device or a core network device in the first network or system; and receiving, by the terminal device, a paging message sent by the first network device, wherein a type of the paging message is a second class paging message, and the second class paging message comprises attribute information of downlink data to be transmitted; and wherein the first indication information comprises information of a state expected to be in the first network or system by the terminal device.

* * * * *